(12) United States Patent
Ikuta et al.

(10) Patent No.: US 11,287,518 B2
(45) Date of Patent: Mar. 29, 2022

(54) OPTICAL SENSOR AND ELECTRONIC DEVICE

(71) Applicant: SHARP KABUSHIKI KAISHA, Sakai (JP)

(72) Inventors: Yoshiki Ikuta, Sakai (JP); Hideki Sato, Sakai (JP); Takuma Hiramatsu, Sakai (JP); Takayuki Shimizu, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 687 days.

(21) Appl. No.: 16/306,514

(22) PCT Filed: Apr. 21, 2017

(86) PCT No.: PCT/JP2017/016069
§ 371 (c)(1),
(2) Date: Nov. 30, 2018

(87) PCT Pub. No.: WO2017/208673
PCT Pub. Date: Dec. 7, 2017

(65) Prior Publication Data
US 2019/0129015 A1    May 2, 2019

(30) Foreign Application Priority Data

Jun. 2, 2016 (JP) .............................. JP2016-111291

(51) Int. Cl.
*G01S 7/4865* (2020.01)
*G01S 7/497* (2006.01)
(Continued)

(52) U.S. Cl.
CPC .......... *G01S 7/4865* (2013.01); *G01S 7/4863* (2013.01); *G01S 7/497* (2013.01); *G01S 17/10* (2013.01); *G01S 17/14* (2020.01)

(58) Field of Classification Search
CPC ........ G01S 17/10; G01S 7/4865; G01S 7/497; G01S 17/14; G01S 7/4863; G01S 17/32;
(Continued)

(56) References Cited

U.S. PATENT DOCUMENTS 6,295,413 B1 * 9/2001 Ogasawara ............ G03B 15/05
                                                    327/101
6,522,395 B1 * 2/2003 Bamji ..................... G01S 7/487
                                                    356/5.01
(Continued)

FOREIGN PATENT DOCUMENTS

JP    2006-337302 A    12/2006
JP    2012-215521 A    11/2012
(Continued)

*Primary Examiner* — Yuqing Xiao
*Assistant Examiner* — Amir J Askarian
(74) *Attorney, Agent, or Firm* — ScienBiziP, P.C.

(57) ABSTRACT

An optical sensor of the present invention changes a light-emitting period of a light-emitting element and a period of a reference clock that is used by a time difference extracting circuit, depending on whether or not a digital value that is output from a first digital calculating portion exceeds a reference value in a determination period. With this, there is achieved an optical sensor capable of maintaining both of measurement accuracy at short distance and measurement accuracy at long distance when a housing panel is present between the optical sensor and a detection target.

10 Claims, 32 Drawing Sheets

(51) Int. Cl.
*G01S 17/14* (2020.01)
*G01S 17/10* (2020.01)
*G01S 7/4863* (2020.01)

(58) Field of Classification Search
CPC .... G01S 7/4804; G01S 7/4861; G01S 7/4868; G01P 3/36; G01P 5/248; H03M 1/0624
See application file for complete search history.

(56) References Cited

U.S. PATENT DOCUMENTS

| | | | |
|---|---|---|---|
| 7,202,941 B2 * | 4/2007 | Munro | G01S 7/483 356/4.1 |
| 7,486,386 B1 * | 2/2009 | Holcombe | G01S 7/497 356/4.01 |
| 8,269,430 B2 * | 9/2012 | Nakai | H05B 45/46 315/307 |
| 11,204,421 B2 * | 12/2021 | Inoue | G01S 17/10 |
| 2007/0263202 A1 | 11/2007 | Ohtomo et al. | |
| 2008/0100822 A1 * | 5/2008 | Munro | G01S 7/483 356/4.01 |
| 2011/0163233 A1 * | 7/2011 | Ng | G01J 5/20 250/338.4 |
| 2014/0231631 A1 | 8/2014 | Moore et al. | |
| 2017/0034888 A1 * | 2/2017 | Verma | G01D 5/30 |

FOREIGN PATENT DOCUMENTS

| | | |
|---|---|---|
| JP | 5644294 B2 | 12/2014 |
| JP | 2015-108629 A | 6/2015 |

* cited by examiner

OPTICAL SENSOR AND ELECTRONIC DEVICE

TECHNICAL FIELD

The present invention relates to an optical sensor and an electronic device including the optical sensor.

BACKGROUND ART

Hitherto, in optical communication and time-of-flight measurement (TOF), as light-receiving elements configured to detect faint light at high speed, avalanche photodiodes that utilize the avalanche amplification (avalanche) effect of photodiodes have been used (for example, PTL 1). When a reverse bias voltage that is smaller than a breakdown voltage is applied to the avalanche photodiode, the avalanche photodiode operates as a linear mode photodiode, and its output current fluctuates in positive correlation with the amount of received light. When a reverse bias voltage that is the breakdown voltage or larger is applied to the avalanche photodiode, on the other hand, the avalanche photodiode operates as a Geiger mode photodiode. The Geiger mode avalanche photodiode causes an avalanche phenomenon even with the incidence of single photons, and hence provides large output current. Thus, the Geiger mode avalanche photodiode is called single photon avalanche diode (SPAD).

When a quenching resistor is connected in series to the Geiger mode avalanche photodiode, binary pulse output can be obtained. Such a circuit includes, for example, a photodiode PD10, an active quenching resistor R10 (resistance component of MOS transistor), and a buffer BUF10 as illustrated in FIG. 34.

The photodiode PD10 is a Geiger mode avalanche photodiode. When a bias voltage that is a breakdown voltage or larger is applied to the photodiode PD10, the photodiode PD10 causes the avalanche phenomenon with the incidence of single photons to cause current to flow. When the current flows through the active quenching resistor R10 connected in series to the photodiode PD10, a voltage between terminals of the active quenching resistor R10 increases, and along with this, a bias voltage at the photodiode PD10 drops and the avalanche phenomenon stops. When the current due to the avalanche phenomenon does not flow anymore, the voltage between the terminals of the active quenching resistor R10 drops, and the bias voltage that is the breakdown voltage or larger is applied to the photodiode PD10 again. The buffer BUF10 extracts a change in voltage between the photodiode PD10 and the active quenching resistor R10 as binary pulse output.

Further, PTL 2 discloses a method for measuring distance in the following manner: with the use of the SPAD, reflected light and direct light from a light-emitting element are input to different delay locked loop circuits (DLLs), and the amount of delay between output pulses of the two DLLs is converted into a digital value.

CITATION LIST

Patent Literature

PTL 1: Japanese Patent No. 5644294 (registered on Nov. 14, 2014)

PTL 2: U.S. Patent Application Publication No. 2014/0231631 (published on Aug. 21, 2014)

SUMMARY OF INVENTION

Technical Problem

The method disclosed in PTL 2, however, has the following problem. Specifically, for example, when a housing panel is present between a detection target and an optical sensor (light-receiving portion 1, light-receiving portion 2, and light-emitting element) as illustrated in FIG. 9, a signal SPAD is generated on a short distance side (housing panel side), and hence a measured distance has an error depending on whether the housing panel is present or not. In particular, a large error is caused on a long distance side (see FIG. 10).

PTL 2 discloses a method for correcting an error caused on the long distance side by a count value of a housing panel signal and in accordance with a measured distance. In this correction, a light-emitting element has to have a large light-emitting width (light-emitting period) so that there is a portion where the width of a signal due to housing panel reflection and the width of a signal due to detection target reflection overlap each other (amount of delay). In this case, as the light-emitting width is increased, a signal is more likely to have deviation, which leads to an error. In addition, the amount of delay is small on the short distance side, and hence in order to secure the portion where the widths of the signals overlap each other, which is used for the correction, the light-emitting width has to be relatively large, with the result that an error in a distance measurement value is relatively large. In particular, this problem is conspicuous when the light-emitting width is increased to cope with long distance measurement.

As a consequence, the related-art optical sensor cannot maintain both of measurement accuracy at short distance and measurement accuracy at long distance when a housing panel is present between the optical sensor and a detection target.

The present invention has been made in view of the problem in the long distance, and it is an object of the present invention to achieve an optical sensor capable of maintaining both of measurement accuracy at short distance and measurement accuracy at long distance when a housing panel is present between the optical sensor and a detection target.

Solution to Problem

In order to solve the problem described above, according to an aspect of the present invention, there is provided an optical sensor including: a light-emitting element; a first light-receiving portion of a photon counting type configured to output a pulse in synchronization with incidence of a photon due to reflected light from a body; a second light-receiving portion of the photon counting type placed near the light-emitting element and configured to output a pulse in synchronization with incidence of a photon due to reflected light from inside a sensor package; a time difference extracting circuit configured to extract a time difference corresponding to distance on a spatial optical path by using pulse output from the first light-receiving portion, pulse output from the second light-receiving portion, and a reference clock; a first digital calculating portion configured to count pulses in the pulse output from the first light-receiving portion and output a digital value; and a period changing circuit configured to change, when a pulse count with which sufficient measurement accuracy of a measured distance to the body is obtained is defined as a reference value, a light-emitting period of the light-emitting element and a period of the reference clock depending on whether or not the digital value that is output from the first digital calculating portion exceeds the reference value in the distance measurement period.

Advantageous Effects of Invention

According to the aspect of the present invention, there is provided an effect that enables maintaining both of measurement accuracy at short distance and measurement accuracy at long distance when a housing panel is present between the optical sensor and a detection target.

DESCRIPTION OF EMBODIMENTS

Embodiment 1

Embodiments of the present invention are described in detail below.
(Overview of Optical Sensor)
FIG. 1 is a block diagram illustrating the schematic configuration of an optical sensor 101 according to the present embodiment.

Figure 1:
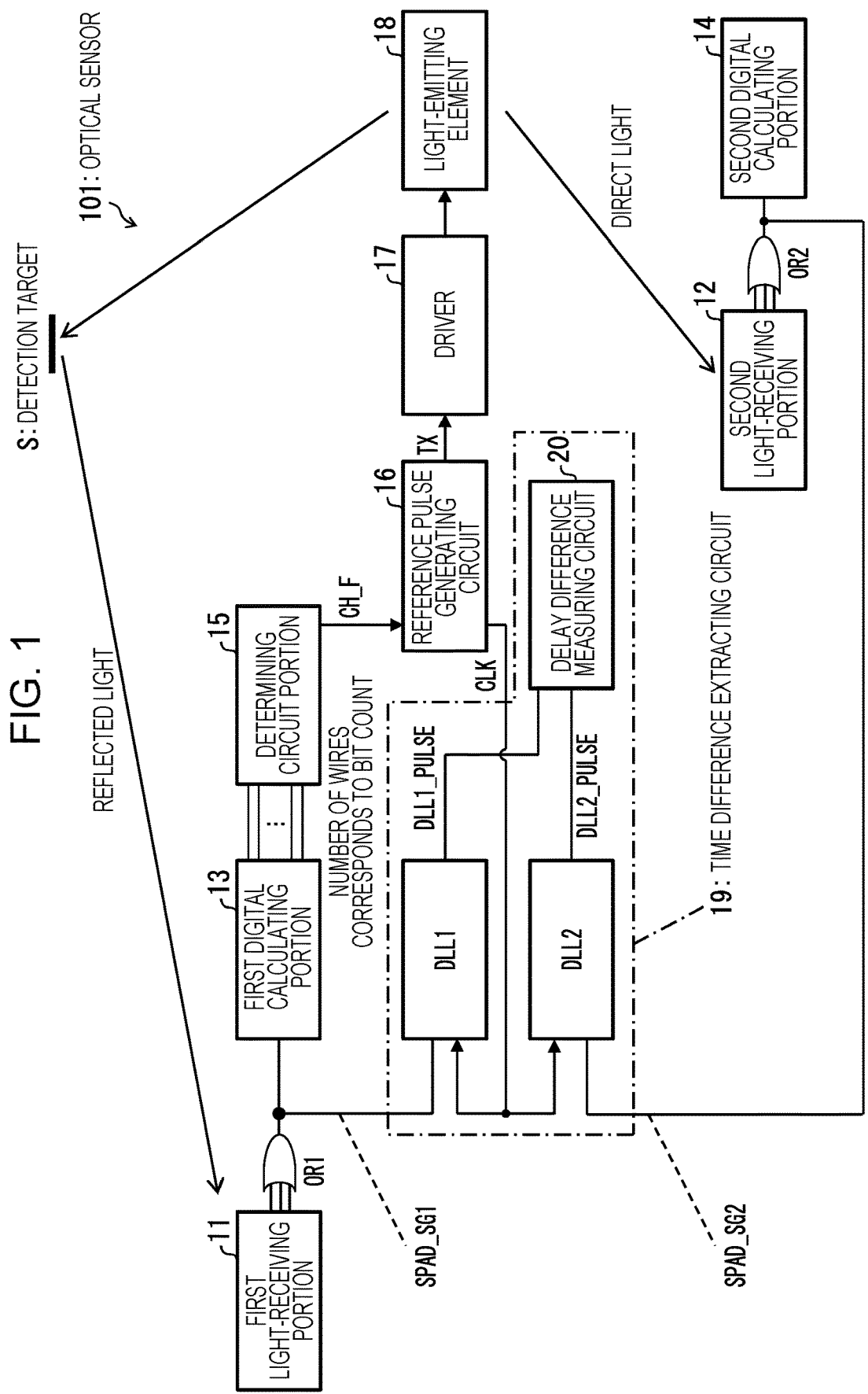
FIG. 1 is a block diagram of an optical sensor according to Embodiment 1 of the present invention.

The optical sensor 101 includes, as illustrated in FIG. 1, a first light-receiving portion 11 of a photon counting type configured to output a pulse in synchronization with the incidence of a photon due to reflected light from a detection target S (body), a second light-receiving portion 12 of the photon counting type placed near a light-emitting element 18 and configured to output a pulse in synchronization with the incidence of a photon due to reflected light from inside a sensor package (including direct light from the light-emitting element 18), a first digital calculating portion 13 configured to count pulses in pulse output from the first light-receiving portion 11 and output a digital value, a second digital calculating portion 14 configured to count pulses in pulse output from the second light-receiving portion 12 and output a digital value, a determining circuit portion 15 configured to determine whether a digital value that is output from the first digital calculating portion 13 exceeds a reference value, a reference pulse generating circuit 16 configured to give a reference pulse to a driver 17 (driver circuit) and give a reference clock to a time difference extracting circuit 19, the driver (driver circuit) 17 configured to pulse-drive the light-emitting element 18, the light-emitting element 18, and the time difference extracting circuit 19 configured to extract a time difference between the pulse output from the first light-receiving portion 11 and the pulse output from the second light-receiving portion 12.

The optical sensor 101 having the above-mentioned configuration obtains a distance to the detection target S (light reflecting object). Specifically, when the light-emitting element 18 radiates pulse light and reflected light from the detection target S enters the first light-receiving portion 11 while reflected light from inside the sensor package (including direct light) enters the second light-receiving portion 12, the first light-receiving portion 11 and the second light-receiving portion 12 output pulses at frequencies corresponding to the light amounts. The pulse outputs are input to the time difference extracting circuit 19 as binary pulse outputs having a time difference corresponding to a difference in distance on a spatial optical path. The pulse output that is output from the second light-receiving portion 12 can be regarded as having a distance on the spatial optical path of approximately zero. Thus, the time difference extracting circuit 19 extracts a time difference corresponding to distance on the spatial optical path with the use of the two inputs (pulse output from first light-receiving portion 11 and pulse output from second light-receiving portion 12) and a reference clock that is output from the reference pulse generating circuit 16. In this way, the distance to the detection target S (light reflecting object) can be obtained. Further, the pulse outputs from the first light-receiving portion 11 and the second light-receiving portion 12 are generated non-periodically in a light-emitting width with respect to light reception from the light-emitting element 18. Thus, a DLL1 and a DLL2 that are delay locked loop circuits are used in the time difference extracting circuit 19, and a time difference can be extract by respectively locking an output from the DLL1 and an output from the DLL2 at the center of a light-receiving width of the first light-receiving portion 11 and the center of a light-receiving width of the second light-receiving portion 12.

(Overview of First Light-Receiving Portion 11 and Second Light-Receiving Portion 12)

Figure 2:
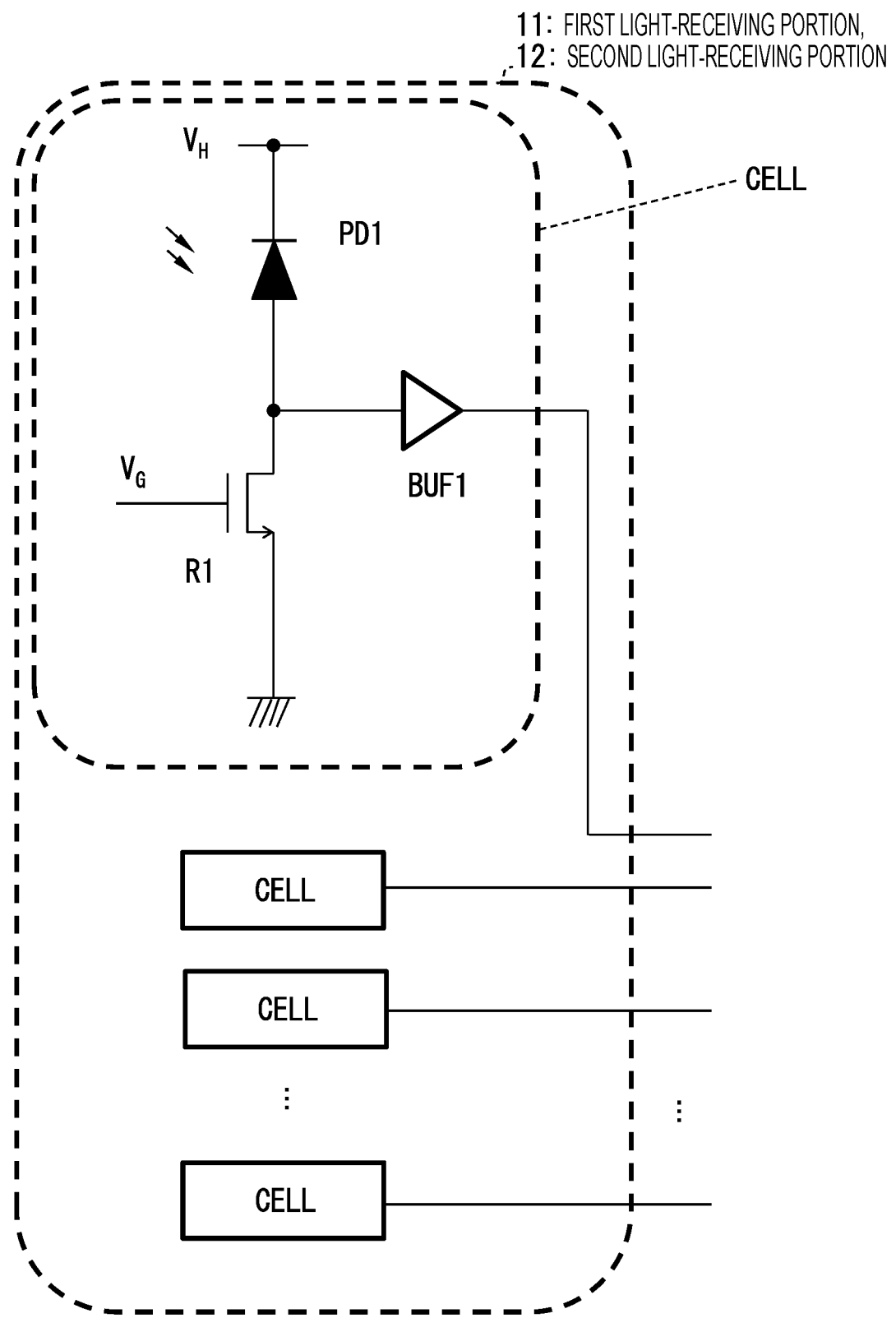
FIG. 2 is a block diagram of a light-receiving portion that constitutes the optical sensor illustrated in FIG. 1.

FIG. 2 is a circuit diagram illustrating the schematic configuration of the first light-receiving portion 11 and the second light-receiving portion 12. Here, the first light-receiving portion 11 and the second light-receiving portion 12 have the same configuration, and hence the first light-receiving portion 11 is described as an example. The first light-receiving portion 11 includes, as illustrated in FIG. 2, a plurality of CELLs each including a photodiode PD1, an active quenching resistor R1 (resistance component of MOS transistor), and a buffer BUF1. The photodiode PD1 is a Geiger mode avalanche photodiode, and an incident light amount is taken by the active quenching resistor R1 and the buffer BUF1 as a binary pulse output. Pulses output from the first light-receiving portion 11 are subjected to the OR operation by an OR1. The first digital calculating portion 13 counts the pulses and outputs a digital value to the determining circuit portion 15.

(Operation (1) of Optical Sensor 101)

Figure 3:
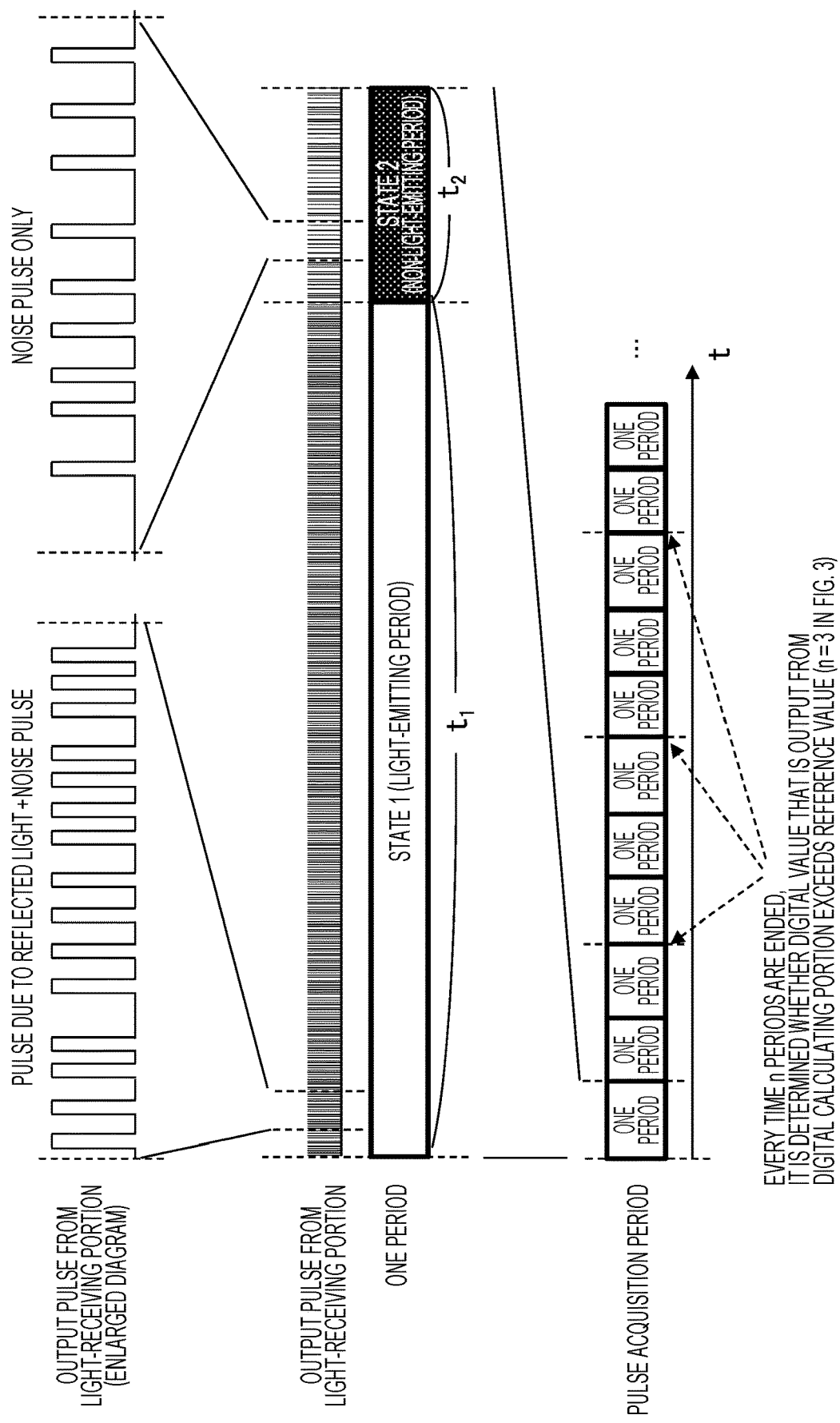
FIG. 3 is a diagram for explaining operation of the optical sensor illustrated in FIG. 1.

FIG. 3 is a diagram for explaining operation in a period in which pulses are acquired from the first light-receiving portion 11 and the second light-receiving portion 12 (a period in which a distance to the detection target S is measured) in the optical sensor 101 illustrated in FIG. 1. Here, the light-emitting element 18 has two states in the pulse acquisition period, that is, a first state (light-emitting period) in which the light-emitting element 18 iteratively emits pulses and a second state (non-light-emitting period) in which the light-emitting element 18 emits no light. The light-emitting element 18 iterates the light-emitting operation with one period that is a period that arrives at a certain time ratio at which the first state and the second state satisfy time of first state (t1)>time of second state (t2) (time of first state:time of second state=t1:t2).

The pulses output from the first light-receiving portion 11 and the second light-receiving portion 12 include noise pulses generated by ambient light or thermally generated carriers, in addition to pulses due to reflected light from the detection target S (body) of the light-emitting element 18 or light reflected from inside the sensor package. In the first state, pulses in which pulses due to the reflected light and the noise pulses are mixed are output from the first light-receiving portion 11 and the second light-receiving portion 12. In the second state, only the noise pulses are output from the first light-receiving portion 11 and the second light-receiving portion 12.

In the first digital calculating portion 13 and the second digital calculating portion 14, acquired pulses are counted as a pulse count (C1) in the first state, and a value obtained by multiplying an acquired pulse count (C2) by a coefficient of (time of first state (t1)/time of second state (t2)) in one period is subtracted in the second state. A digital value that is output from the digital calculating portion when one period is ended is expressed by Expression (1).

$$C1-C2\times(t1/t2) \quad (1):$$

Here, the first state and the second state are successively established in a short time in consideration of a change in external environment such as ambient light so that how many noise pulses are generated during the time of the first state can be derived in the second term of Expression (1), and only a pulse count due to reflected light in the first state can be obtained by subtracting the second term from C1.

Further, time of first state (t1)>time of second state (t2) is set, and hence the ratio of the first state in which pulses are iteratively emitted is increased so that valid data (pulse due to reflected light component) is acquired fast, with the result that a time loss due to the second state, in which only noise pulses are generated, can be reduced.

The calculation is iteratively performed for n periods, and a pulse count acquired in the first state and a pulse count acquired in the second state in the n-th period are denoted by $C1\_n$ and $C2\_n$, respectively. Then, a digital value that is output from the first digital calculating portion 13 or the second digital calculating portion 14 is expressed by Expression (2).

$$C1\_n-C2n\times(t1/t2) \quad (2):$$

In this way, only pulses due to reflected light are counted. A pulse count with which sufficient measurement accuracy is obtained through acquisition of valid data (pulse due to reflected light) is set to a reference value of the pulse. Every time the n periods (n≥1) are ended, it is determined whether a digital value that is output from the first digital calculating portion 13 exceeds the reference value (FIG. 3 illustrates a case where n is 3). When the digital value falls below the reference value, the pulse acquisition period is continued, whereas when the digital value exceeds the reference value, the pulse acquisition period is ended.

Specifically, the first digital calculating portion 13 and the second digital calculating portion 14 count pulses in the first state and subtract a value obtained by multiplying a pulse count by the coefficient of (time of first state/time of second state) in one period in the second state. Every time the n periods (n≥1) are ended, a digital value that is output from the first digital calculating portion for the first light-receiving portion is input to the first determining circuit portion (determining circuit portion 15), and it is determined whether the digital value exceeds the first reference value.

Thus, with the optical sensor 101 having the above-mentioned configuration, a valid data count (pulse count due to reflected light component) of a TOF sensor can be grasped every time the n periods (n≥1) are ended, and hence the pulse acquisition period can be ended as soon as a necessary and sufficient data count is acquired. This reduces the measurement time to the minimum, and highly accurate measurement can thus be carried out in a short time.

(Configuration of DLL1 and DLL2)

Figure 4:
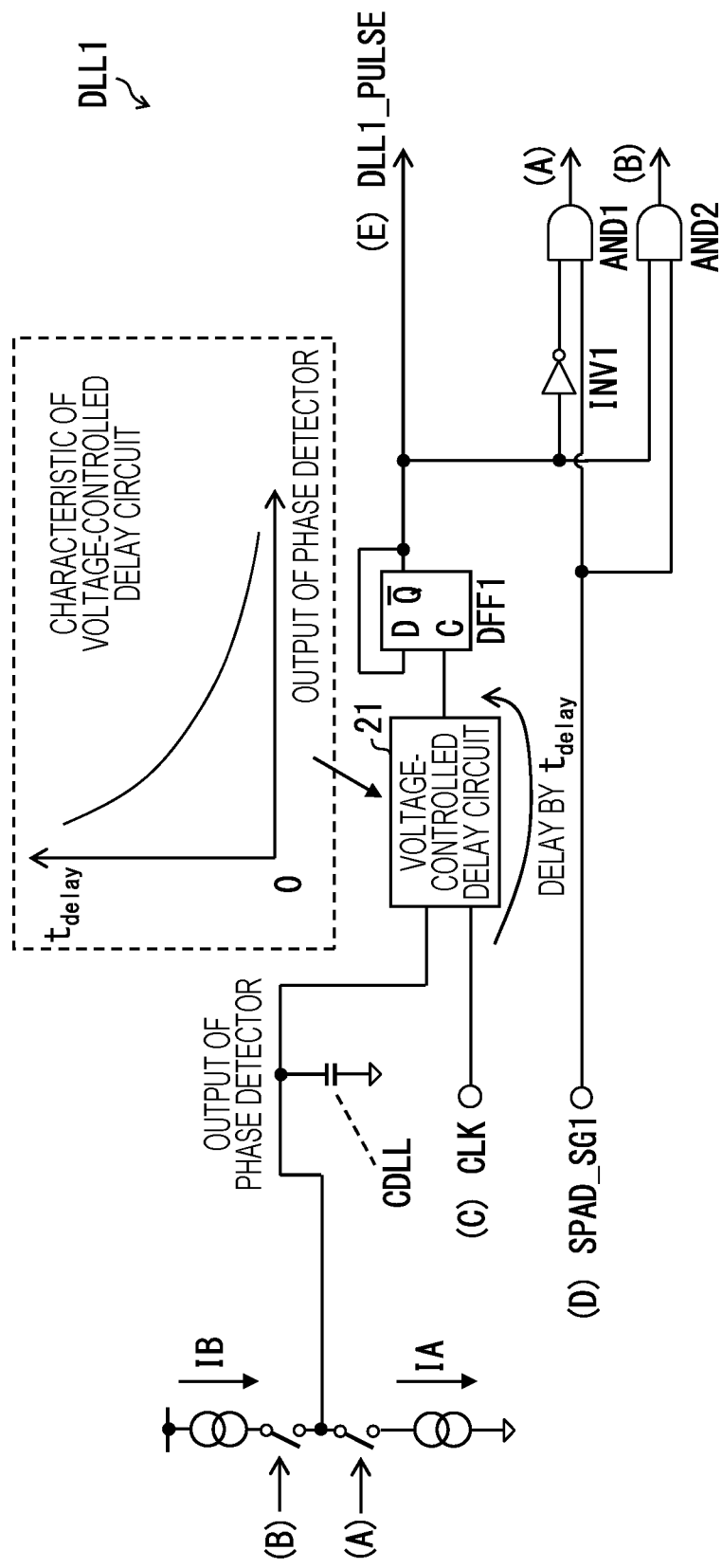
FIG. 4 is a block diagram of a DLL that constitutes the optical sensor illustrated in FIG. 1.

FIG. 4 is a circuit diagram of the DLL1 and the DLL2 of the time difference extracting circuit 19. The DLL1 and the DLL2 have the same configuration, and hence the DLL1 is described below. The DLL1 includes, as illustrated in FIG. 4, a phase detector (not illustrated), a voltage-controlled delay circuit 21, and a capacitor CDLL configured to hold a control voltage for the voltage-controlled delay circuit 21. The DLL1 charges the capacitor CDLL to a certain value in a first period, inputs, to the phase detector, a clock obtained by ¼ frequency-dividing a reference clock of the voltage-controlled delay circuit 21, and a ¼ frequency-divided output of the voltage-controlled delay circuit 21 in a second period, and inputs, to the phase detector, a pulse from the first light-receiving portion 11 and a clock obtained by ½ frequency-dividing output of the voltage-controlled delay circuit 21 in a third period.

Specifically, the DLL1 includes, as illustrated in FIG. 4, the capacitor CDLL, the voltage-controlled delay circuit 21, a DFF1, an INV1, an AND1, and an AND2. Through calculation by the AND2, (B)=1 is satisfied when (E) DLL1_PULSE=1 and (D) SPAD_SG1=1 are satisfied, and a current IB flows through the capacitor CDLL. Through calculation by the AND1 and the INV1, (A)=1 is satisfied when (E) DLL1_PULSE=0 and (D) SPAD_SG1=1 are satisfied, and a current IA flows through the capacitor CDLL. Through the operation described above, an input voltage to the voltage-controlled delay circuit 21 is determined by a voltage at the CDLL, and (C) CLK that is delayed by $t_{delay}$ is input to the DFF1. A negative output of the DFF1 is input to D, and hence (E) DLL1_PULSE has a frequency that is ½ of the frequency of (C) CLK and a Duty of 50%. The fact that the Duty is 50% means that when an ambient light component other than received light due to the light-emitting element 18 uniformly enters (D) SPAD_SG1, the ambient light component can be removed because the current IA and the current IB are the same in sufficient time integration. The DLL2 in the time difference extracting circuit 19 also has the same configuration as the DLL1.

Figure 5:
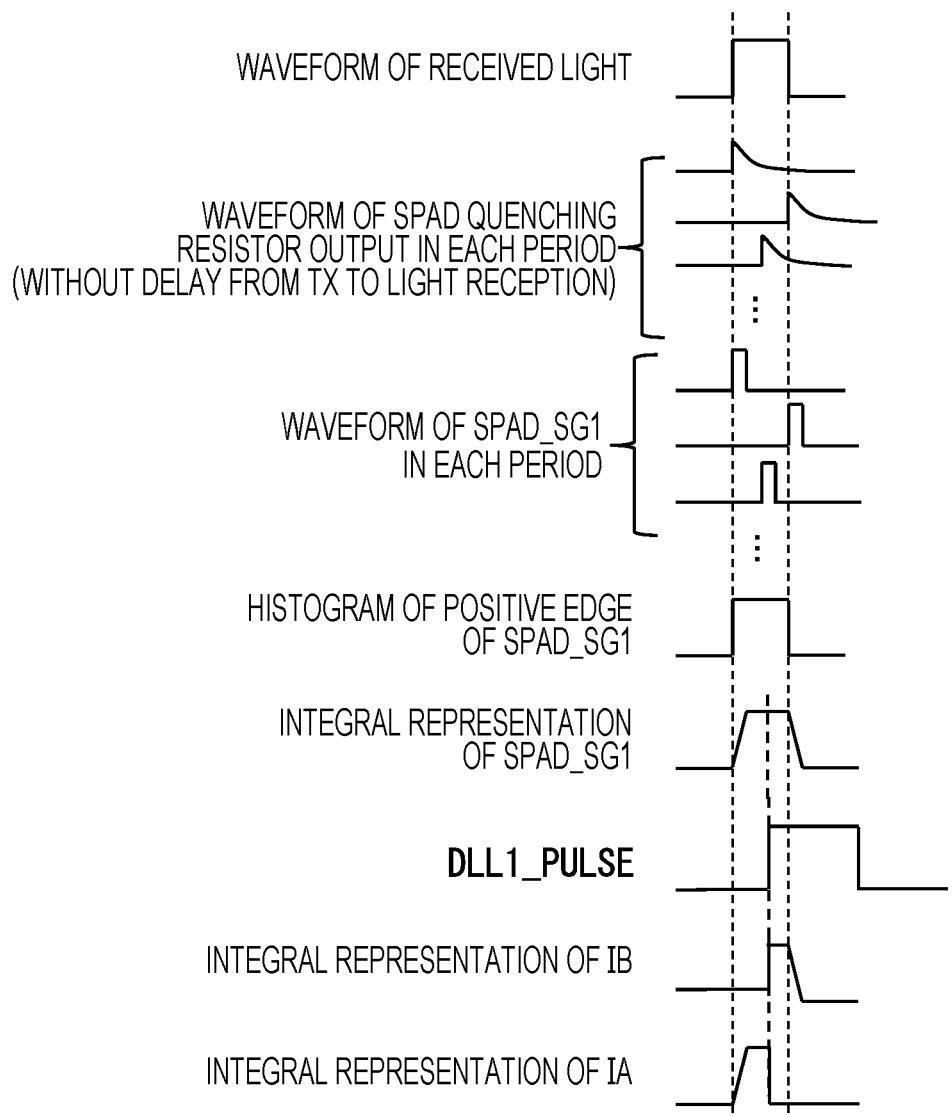
FIG. 5 is a waveform diagram illustrating operation of the DLL in the optical sensor illustrated in FIG. 1.

FIG. 5 is a waveform diagram of the DLL1 in a locked state. As illustrated in FIG. 5, an integration value of IB and an integration value of IA match each other when the rising edge of DLL1_PULSE with a waveform that is obtained through integration of the waveform of SPAD_SG1, which is non-periodically generated, matches a waveform (waveform of received light) when the first light-receiving portion 11 and the second light-receiving portion 12 receive light. This state is the locked state.

(Overview of Reference Pulse Generating Circuit 16)

Figure 6:
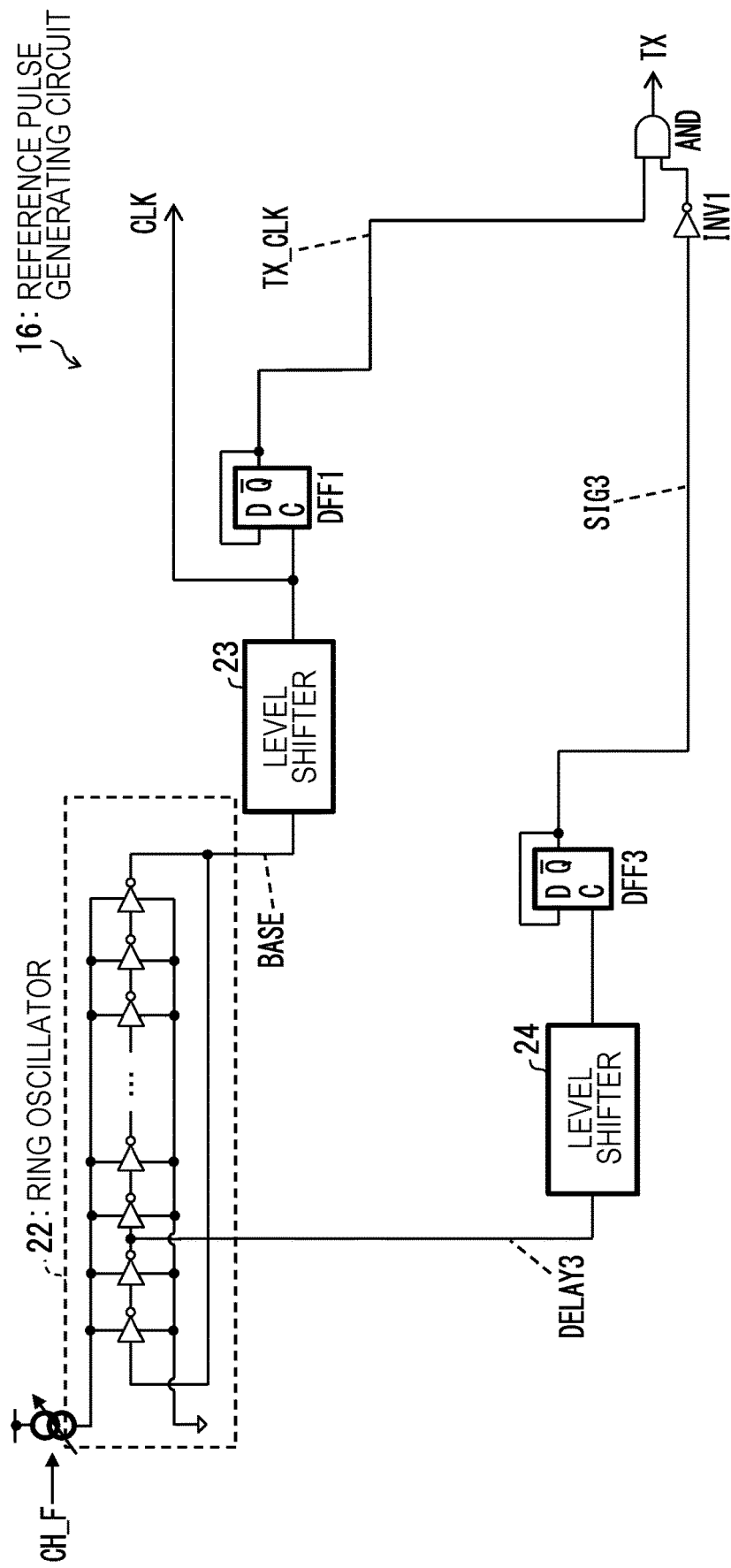
FIG. 6 is a block diagram of a reference pulse generating circuit that constitutes the optical sensor illustrated in FIG. 1.

FIG. 6 is a circuit diagram illustrating the reference pulse generating circuit 16. The reference pulse generating circuit 16 includes, as illustrated in FIG. 6, a ring oscillator 22, a level shifter 23, a level shifter 24, the DFF1, a DFF3, the INV1, and an AND. The reference pulse generating circuit 16 generates a pulse to a node BASE and a node DELAY3 by the ring oscillator whose input is variable constant current. A clock is output as CLK from BASE via the level shifter 23, and a signal obtained by ½ frequency-dividing CLK by the DFF1 is output as TX_CLK (rising timing of TX). TX is a drive signal for the light-emitting element 18 and is generated to correspond to the delay width of DELAY3 through calculation of TX_CLK in question and SIG3 obtained by ½ frequency-dividing DELAY3, which is delayed from BASE, by the DFF3.

The frequency of the ring oscillator 22 can be changed by performing switching to a ring oscillator input current set by CH_F that is output from the determining circuit portion 15.

(Mode Determination Processing in Determining Circuit Portion 15 and Reference Pulse Generating Circuit 16)

Figure 7:
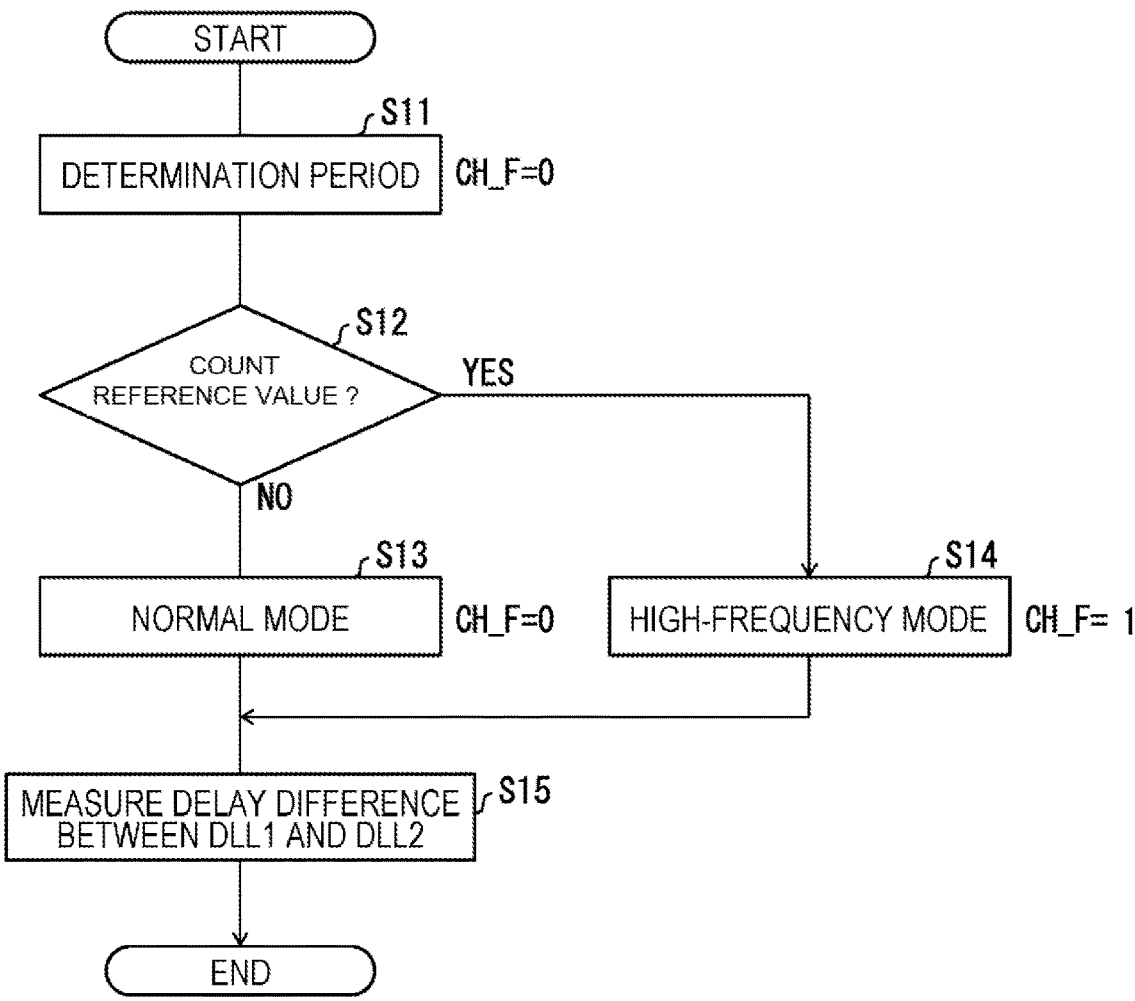
FIG. 7 is a flowchart illustrating the flow of mode determination processing in the optical sensor illustrated in FIG. 1.

FIG. 7 is a flowchart illustrating the flow of mode determination processing in the determining circuit portion 15.

Figure 8:
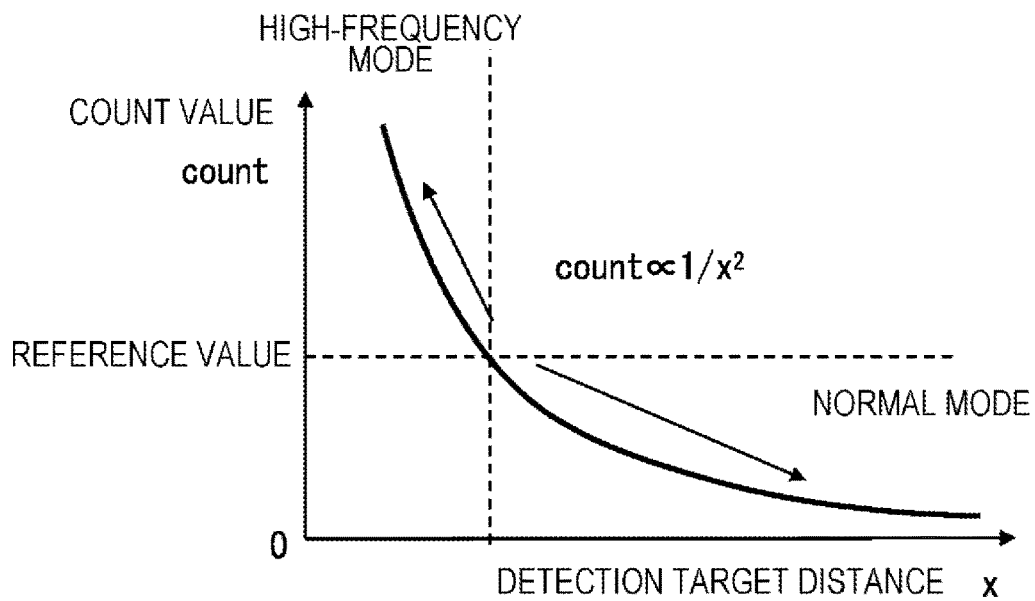
FIG. 8 is a graph illustrating the characteristics of a detection target and a count value.

FIG. 8 is a graph illustrating a relationship between a count value and a detection target distance.

Here, the determining circuit portion 15 outputs CH_F to the reference pulse generating circuit 16 as a determination result. The output CH_F is used in the reference pulse generating circuit 16 for determining whether to set a distance measurement mode to a normal mode or a high-frequency mode. CH_F0 denotes the normal mode and CH_F1 denotes the high-frequency mode. Here, when a pulse count with which sufficient measurement accuracy is obtained through acquisition of pulses due to reflected light is defined as a reference value, the normal mode is a mode for performing measurement at long distance at which a count value falls below the reference value, and the high-frequency mode is a mode for performing measurement at short distance at which a count value exceeds the above-mentioned reference value. Thus, in the high-frequency mode, the light-emitting period of the light-emitting element 18 and the period of CLK (reference clock) of the time difference extracting circuit 19 are set shorter than those in the normal mode. Specifically, in the high-frequency mode, the light-emitting period of the light-emitting element 18 and the period of the reference clock of the time difference extracting circuit 19 are each changed to a period multiplied by a number set in advance.

The reference pulse generating circuit 16 changes the period of CLK to be output to the time difference extracting circuit 19, depending on the types of the output CH_F (CH_F0 or CH_F1), and outputs, to the driver 17 configured to drive the light-emitting element 18, the drive signal TX having a content indicating that the light-emitting period of the light-emitting element 18 is to be changed.

As illustrated in FIG. 7, the determining circuit portion 15 first sets a determination period (distance measurement period) (Step S11), and determines whether or not a count value exceeds the reference value in the determination period (Step S12). Here, as illustrated in FIG. 8, in general, Relational Expression (3) below is satisfied between a detection target distance x and a count value count in the same time.

$$\text{count} \propto 1/x^2 \qquad (3):$$

Here, the count value count is a signal SPAD that is obtained by removing an ambient light component from SPAD_SG1 in a digital calculating portion and thus only has a reflection component.

Thus, when the determining circuit portion 15 determines in Step S12 that a count value exceeds the reference value during distance measurement in the normal mode (CH_F=0) (YES), the normal mode is switched to the high-frequency mode (CH_F=1) because the detection target distance x is short distance (Step S14). On the other hand, when the determining circuit portion 15 determines in Step S12 that the count value does not exceed the reference value, that is, falls below the reference value (NO), the normal mode (CH_F=0) is kept because the detection target distance x is long distance (great distance) (Step S13). After that, the reference pulse generating circuit 16 changes the period of CLK depending on the types of the output CH_F (CH_F0 or CH_F1) from the determining circuit portion 15, and outputs the resultant to the time difference extracting circuit 19, to thereby achieve measurement of a delay difference between the DLL1 and the DLL2 (Step S15).

As described above, the determining circuit portion 15 and the reference pulse generating circuit 16 achieve a period changing circuit configured to change, when a pulse count with which sufficient measurement accuracy of a measured distance to the detection target S is obtained is defined as a reference value, the light-emitting period of the light-emitting element 18 and the period of the reference clock of the time difference extracting circuit 19 depending on whether or not a digital value that is output from the first digital calculating portion 13 exceeds the reference value in the distance measurement period.

(Effect)

Figure 9:
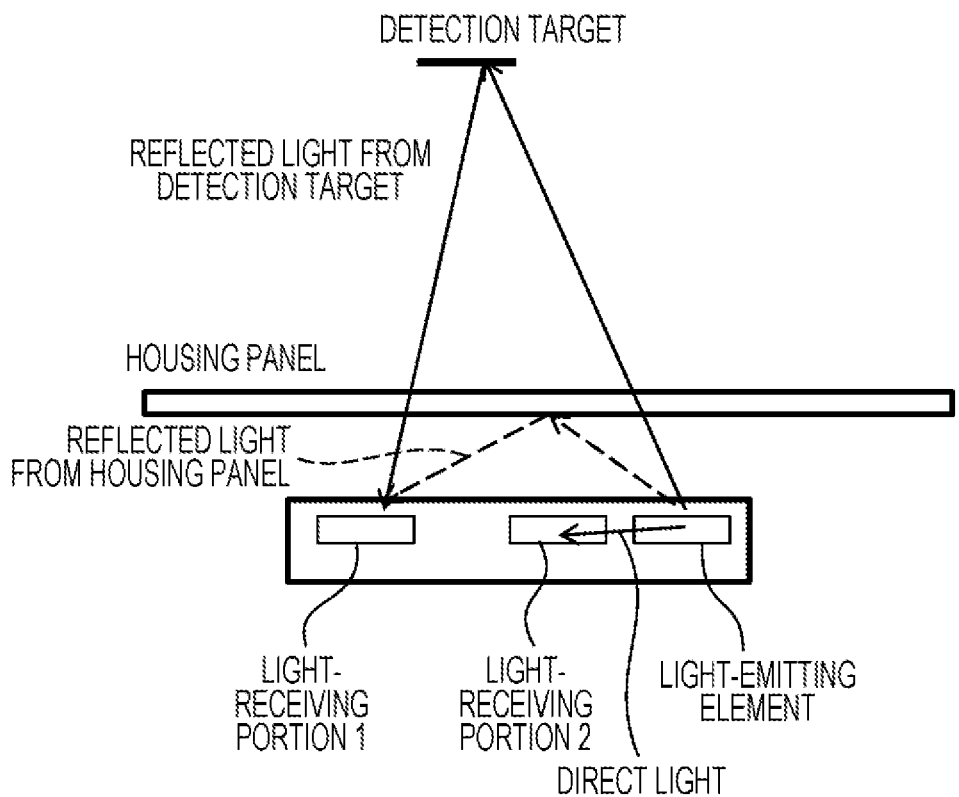
FIG. 9 is a schematic diagram illustrating a light-receiving path of each light-receiving portion of the optical sensor.

FIG. 9 is a diagram schematically illustrating the light-receiving path of each light-receiving portion of the optical sensor when a housing panel is placed between the detection target and the optical sensor.

Figure 10:
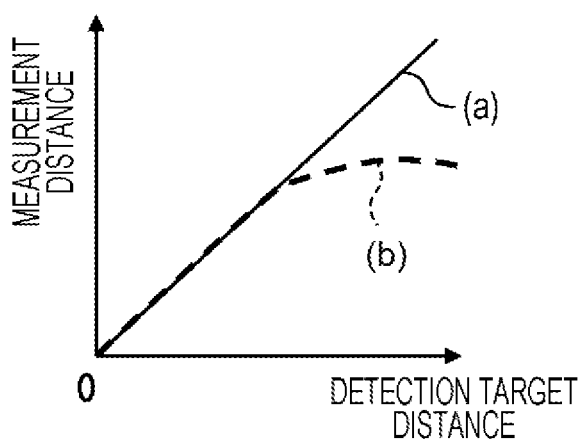
FIG. 10 is a graph illustrating how housing panel reflection affects a measured distance.

FIG. 10 is a graph illustrating how housing panel reflection affects a measured distance when it is assumed that the housing panel is present as illustrated in FIG. 9.

In the graph of FIG. 10, a characteristic (a) that corresponds to a case where the housing panel component is present has a large error particularly on the long distance side because of the following reason: while the amount of a signal SPAD_SG1 of a housing panel component is constant to the detection target distance, a signal SPAD_SG1 of a detection target reflection component has a characteristic that its amount is reduced as the distance is increased, and hence the signal SPAD_SG1 of the housing panel component is relatively increased. A lock position of the DLL1 is a weighted average position between the signal amount of SPAD_SG1 of the housing panel component and the signal amount of SPAD_SG1 of the detection target reflection component. Thus, as a method for correcting a measured distance in such a case, a method including the following procedures (a) to (c) is given.

(a) A count value of the signal SPAD_SG1 due to the housing panel component is measured in advance.

(b) A count value of the signal SPAD_SG1 is acquired during distance measurement.

Here, the above-mentioned count value includes a housing panel reflection component (hereinafter referred to as housing reflection component) and a detection target reflection component.

In the optical sensor 101 according to the present embodiment, an ambient light component is removed at this stage.

(c) A correction delay value is converted to a distance value, the correction delay value being obtained by performing calculation using Expression (4) below on a measurement delay value obtained by the delay difference measuring circuit 20.

Correction delay value=measurement delay value*Meas_count/(Meas_count−Xtalk_count)     (4):

Here, Xtalk_count denotes the count value of the signal SPAD_SG1 of the housing reflection component, and Meas_count denotes the count value of the signal SPAD_SG1 including the housing reflection component and the detection target reflection component. A DLL lock position only with the housing panel reflection component is equal to a DLL lock position with direct light (distance of 0).

Figure 11:
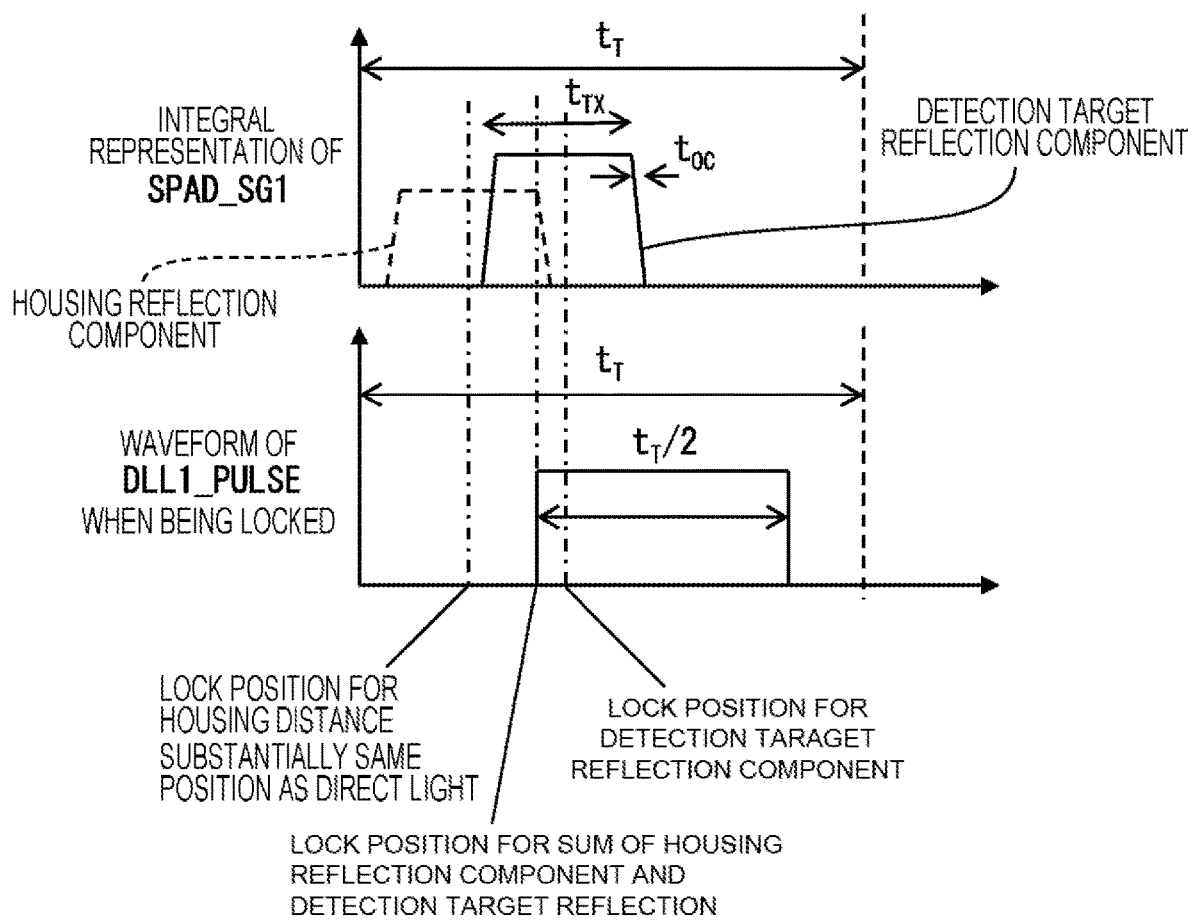
FIG. 11 is a diagram illustrating an example for explaining a DLL lock position due to housing panel reflection.

FIG. 11 is a diagram explaining a state to which the above-mentioned correction method can be applied. In sections in which the waveform of DLL1_PULSE is high and low, the housing reflection component and the detection target reflection component are both included, and hence a weighted average can be normally taken.

Figure 12:
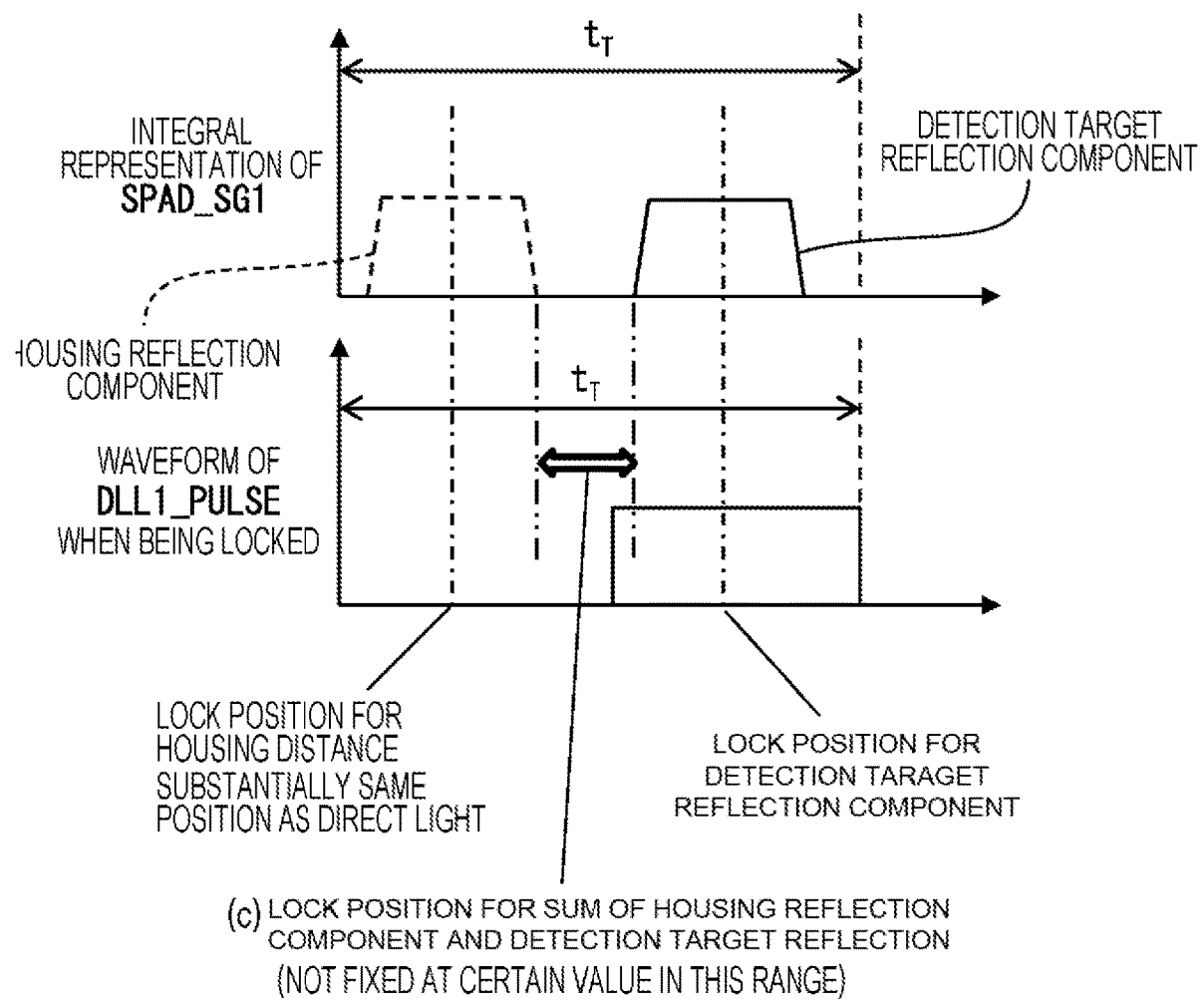
FIG. 12 is a diagram illustrating another example for explaining the DLL lock position due to housing panel reflection.

FIG. 12 is a diagram explaining a state to which the above-mentioned correction method cannot be applied. In a section in which the waveform of DLL1_PULSE is high, only the detection target reflection component is included, and in a section in which the waveform is low, only the housing reflection component is included. A dead zone is thus formed in a period indicated by (c), resulting in instability.

Figure 13:
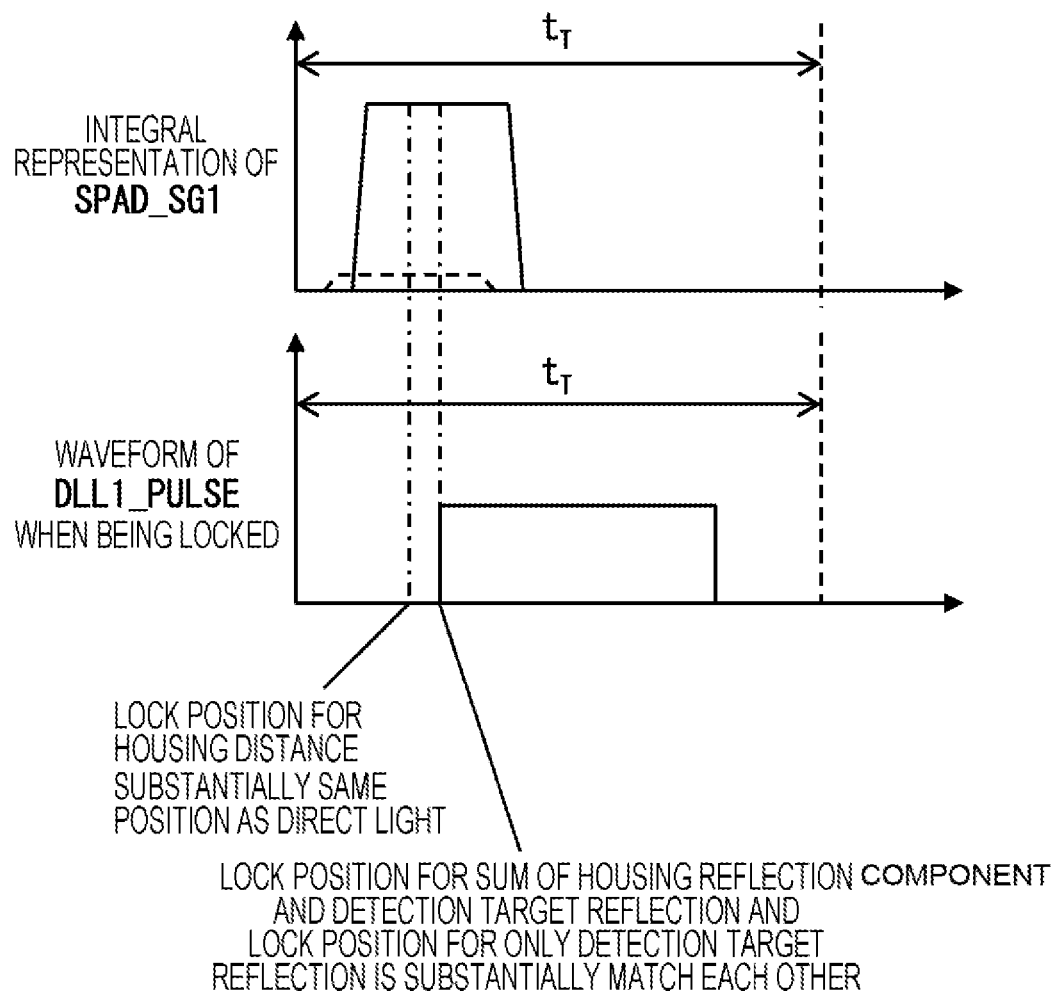
FIG. 13 is a diagram illustrating still another example for explaining the DLL lock position due to housing panel reflection.

FIG. 13 is a diagram illustrating a state where the detection target is present at short distance. In this case, the housing reflection component is sufficiently smaller than the detection target reflection component, and hence sufficient accuracy is obtained without correction.

Thus, in order to avoid the state to which the correction method cannot be applied as illustrated in FIG. 12, a total value of $t_{TX}$ (light-emitting width of light-emitting element 18) and $t_{oc}$ (pulse width of SPAD_SG1) has to be increased to about ½ of $t_T$ (light-emitting period) so that a state in which the housing reflection component and the detection target reflection component overlap with each other lasts long. When the light-emitting width is increased, however, an error due to deviation of the signal SPAD_SG1 itself is increased. This greatly affects an error at short distance at which a delay value is small with respect to the light-emitting width. This error becomes conspicuous when $t_T$ is lengthened to perform long distance measurement. In view of this, the determining circuit portion 15 of the present invention determines short distance, and at short distance, $t_T$ is reduced to an appropriate width and $t_{TX}$ is also reduced to an appropriate width. In this way, in the present invention, both of an increase in measuring distance and a measure against housing reflection can be achieved while accuracy at short distance is kept.

Figure 14:
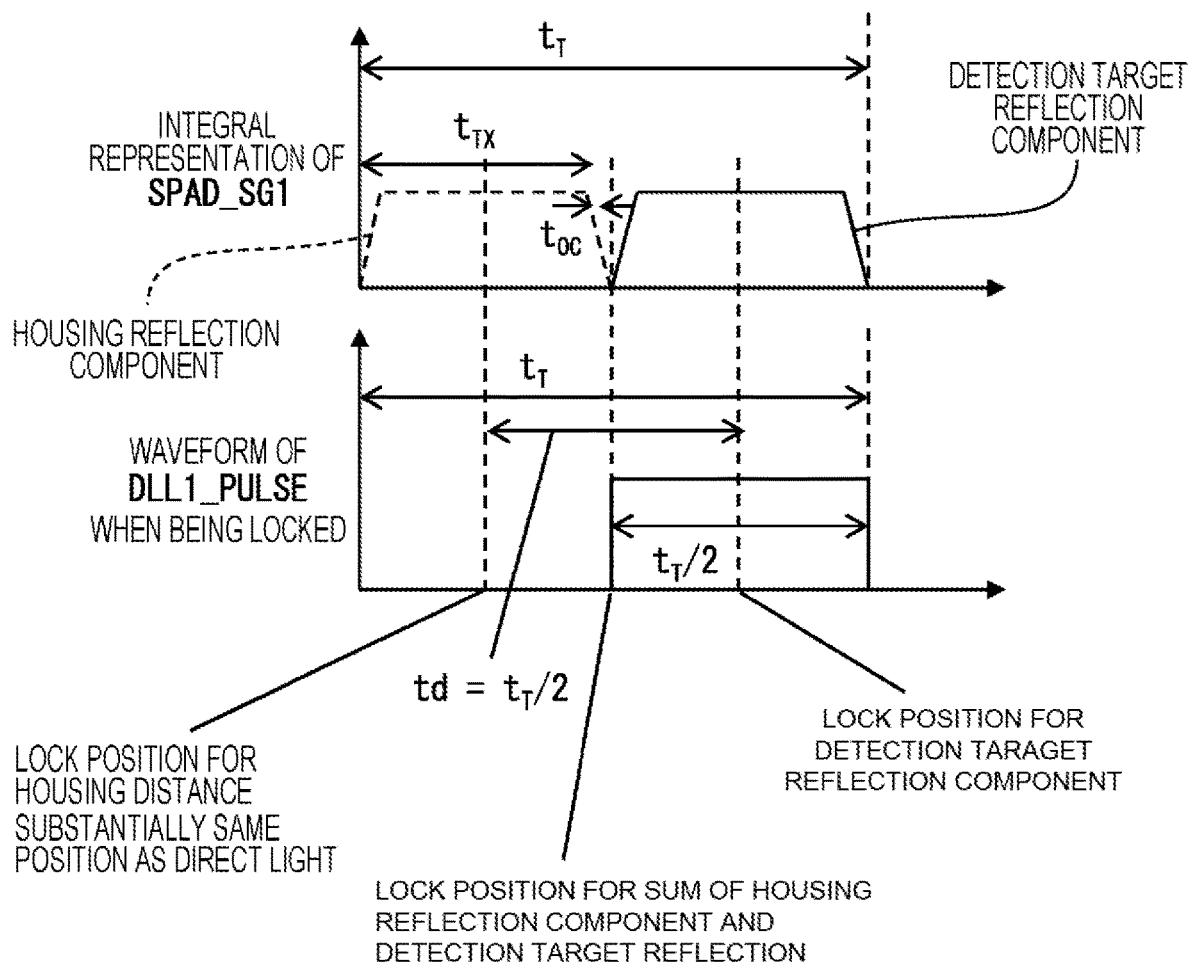
FIG. 14 is a diagram illustrating yet another example for explaining the DLL lock position due to housing panel reflection.

For example, in measuring a distance of at most 2 meters by the method for setting a light-emitting width ($t_{TX}+t_{oc}=t_{T/2}$), when there is no effect, a period corresponding to a delay of about 13.3 ns, which is calculated from a round-trip speed of light, is sufficient as the light-emitting period. However, for example, when there is the housing reflection component and calculation is performed under a state immediately before the state in which determination cannot be made as in the case illustrated in FIG. 12 (FIG. 14: the housing reflection component and the detection target reflection component at this time are the same), the light-emitting period $t_T$ has to satisfy the following conditions because td illustrated in FIG. 14 has to be 13.3 ns.

$t_T>2*td=26.6$ ns $t_{TX}+t_{oc}>13.3$ ns

When measurement is performed at a close distance of 10 cm under the conditions, for example, $t_{TX}+t_{oc}$ is 13.3 ns while a delay, which is calculated from a round-trip speed of light, is about 0.667 ns, and hence deviation of a signal generated in 13.3 ns is large with respect to 0.667 ns, resulting in a large error. This state is avoided as follows: after the determining circuit determines short distance, $t_T$ is cut in half so that $t_{TX}+t_{oc}$ can also be cut in half, namely, 6.65 ns, with the result that the error due to the deviation of the signal is reduced to half. Further, a signal count in the same period is doubled when the same measurement time is set, and hence the deviation of the signal itself can be reduced. This means that even when being set to perform measurement for 2 meters, the optical sensor can have the same accuracy at close distance as when the optical sensor is set to perform measurement for 1 meter.

Further, the light-emitting period to be switched is not necessarily a binary number. A plurality of count determination values can be provided, and a light-emitting period corresponding to distance can be selected.

Embodiment 2

Another embodiment of the present invention is described below. For convenience of description, members having the same functions as the members described in the above-mentioned embodiment are denoted by the same reference characters and description thereof is omitted.

(Overview of Optical Sensor)

Figure 15:
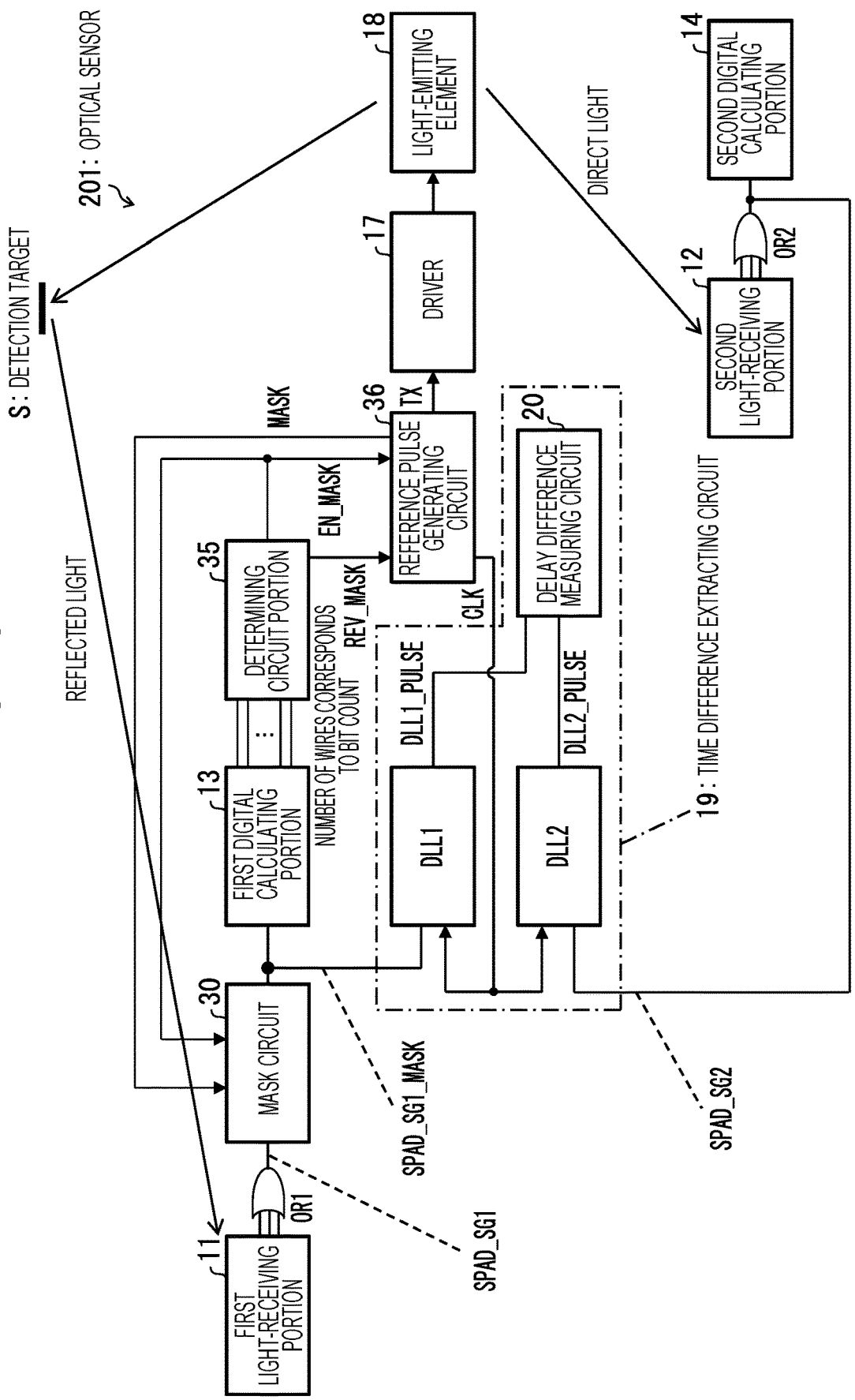
FIG. 15 is a block diagram of an optical sensor according to Embodiment 2 of the present invention.

FIG. 15 is a block diagram of the schematic configuration of an optical sensor 201 according to the present embodiment.

The optical sensor 201 has substantially the same configuration as the optical sensor 101 according to Embodiment 1 but is different from the optical sensor 101 in that a mask circuit 30 is provided on the input side of the first digital calculating portion 13. Further, the configuration of a reference pulse generating circuit 36 is different from that of the reference pulse generating circuit 16 of the optical sensor 101 according to Embodiment 1. In addition, the configuration of a determining circuit portion 35 is different from that of the determining circuit portion 15 of the optical sensor 101 according to Embodiment 1.

(Reference Pulse Generating Circuit 36)

Figure 16:
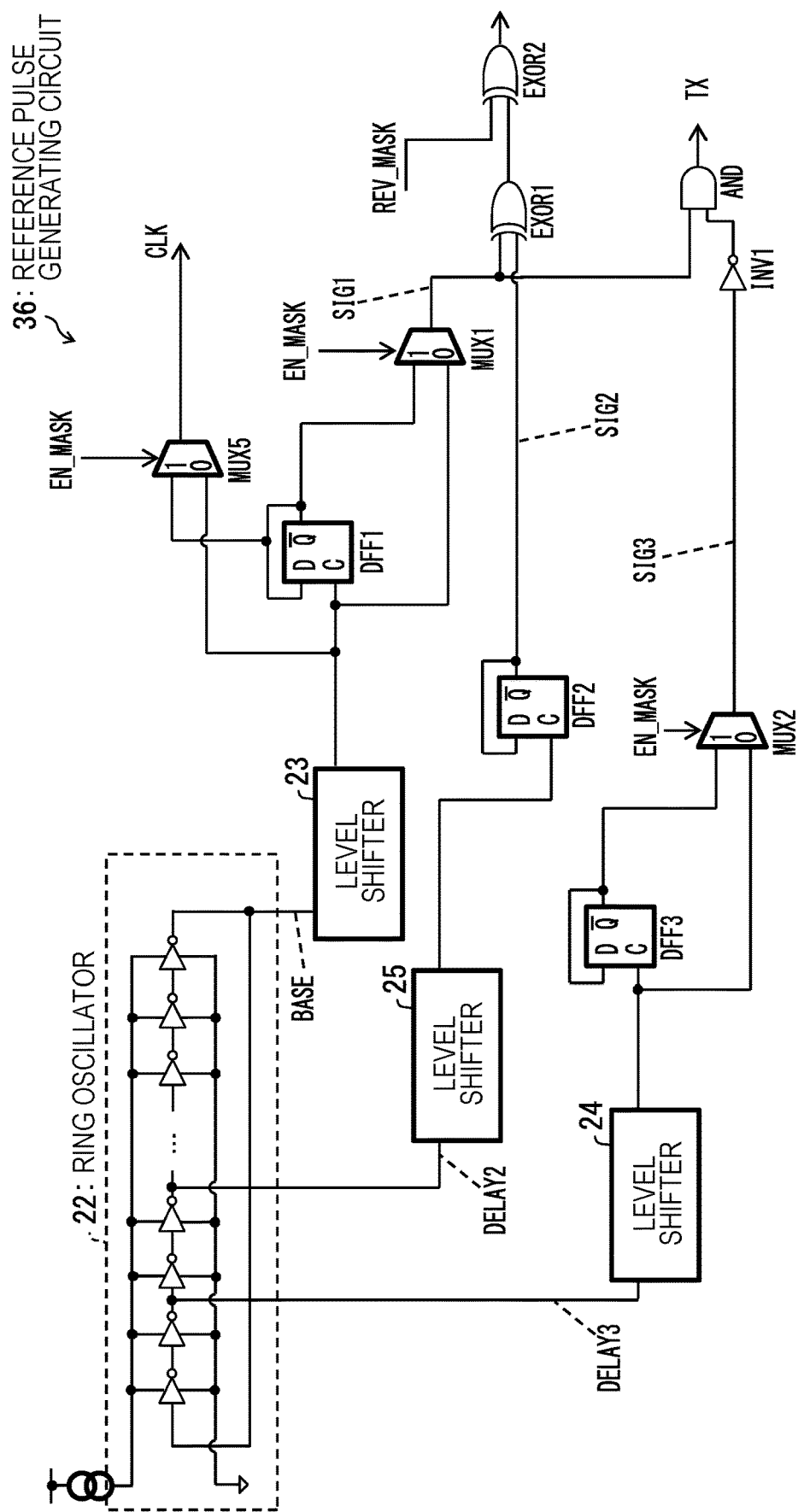
FIG. 16 is a block diagram of a reference pulse generating circuit that constitutes the optical sensor illustrated in FIG. 15.

FIG. 16 is a block diagram illustrating the schematic configuration of the reference pulse generating circuit 36.

The reference pulse generating circuit 36 is obtained by adding, to the reference pulse generating circuit 16 described in Embodiment 1, a level shifter 25 corresponding to a node DELAY2. Specifically, the reference pulse generating circuit 36 generates pulses to the nodes BASE, DELAY2, and DELAY3 by the ring oscillator 22. When the positive edge of a pulse at the node BASE is defined as a reference, a delay relationship positive edge of pulse at node DELAY2>positive edge of pulse at node DELAY3 is satisfied.

Figure 17:
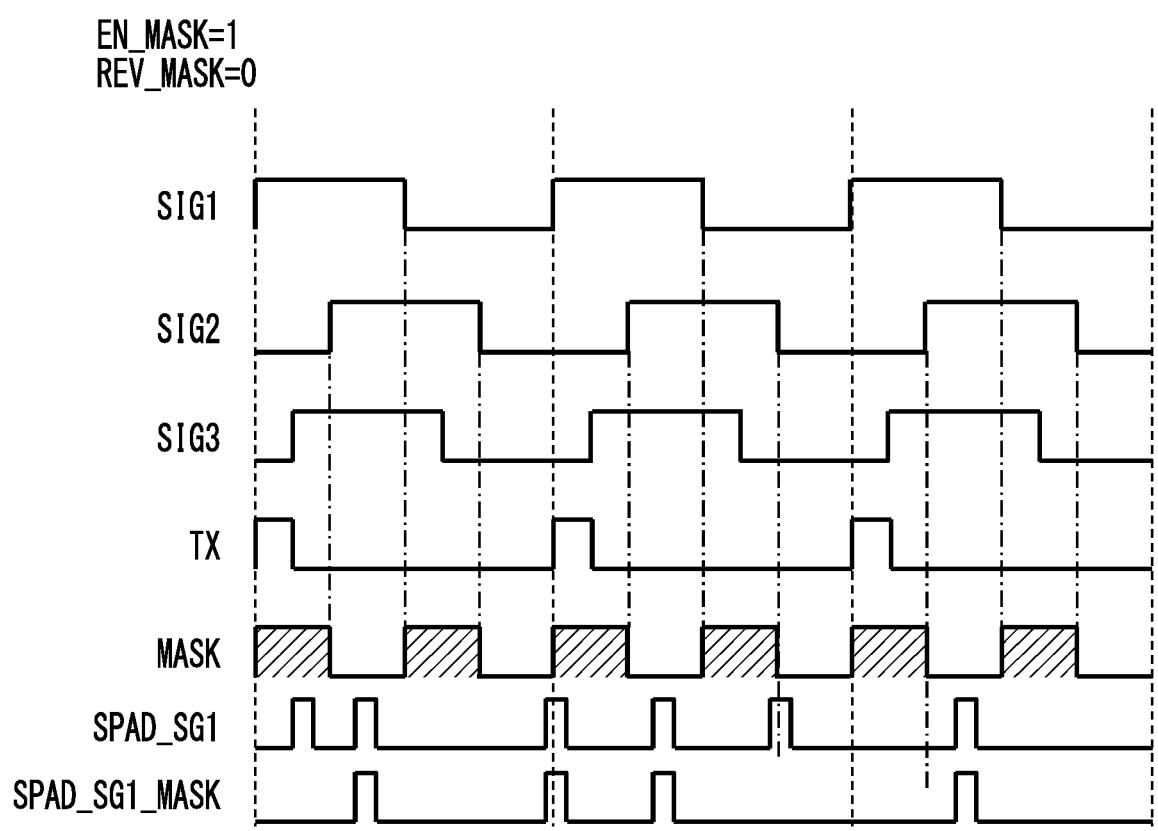
FIG. 17 is a waveform diagram illustrating operation in a mask mode in the optical sensor illustrated in FIG. 15.
Figure 18:
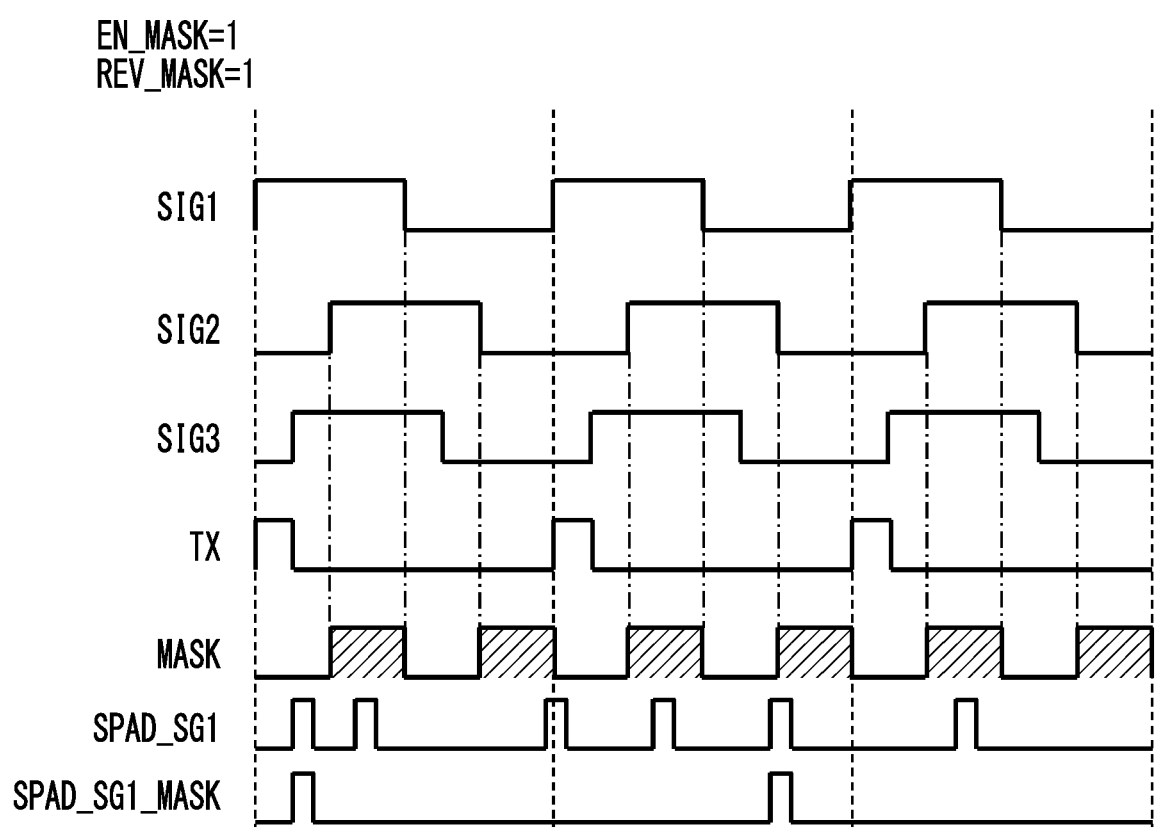
FIG. 18 is a waveform diagram illustrating operation in a determination period in the optical sensor illustrated in FIG. 15.
Figure 19:
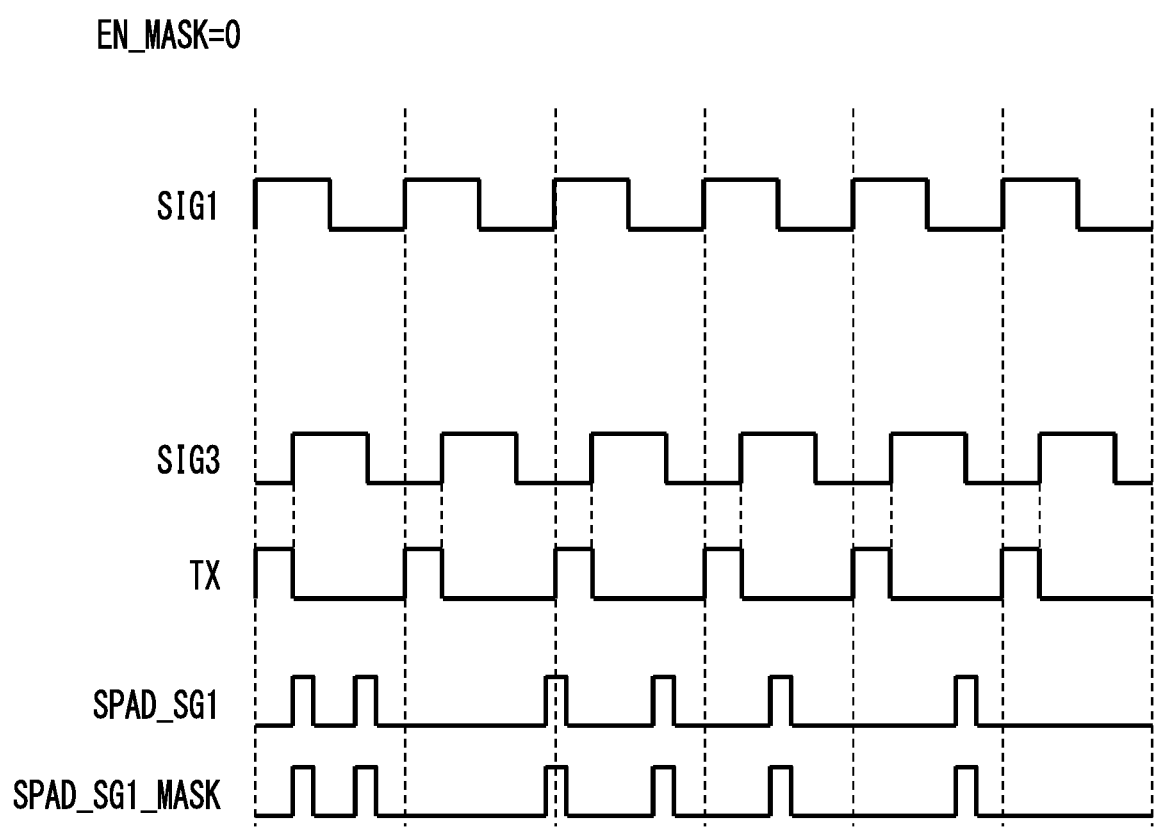
FIG. 19 is a waveform diagram illustrating operation in a normal mode in the optical sensor illustrated in FIG. 15.

When EN_MASK=1 and REV_MASK=0 are satisfied, a delay time at the node DELAY2 is the pulse width of MASK and a delay time at the node DELAY3 is the pulse width of TX. When EN_MASK=1 and REV_MASK=1 are satisfied, the pulse MASK is inverted. The period of MASK is ½ of that of SIG1 and the period of TX is the same as that of SIG1. Waveforms with EN_MASK and REV_MASK under the conditions are illustrated in FIG. 17, FIG. 18, and FIG. 19.

(Mask Circuit 30)

Figure 20:
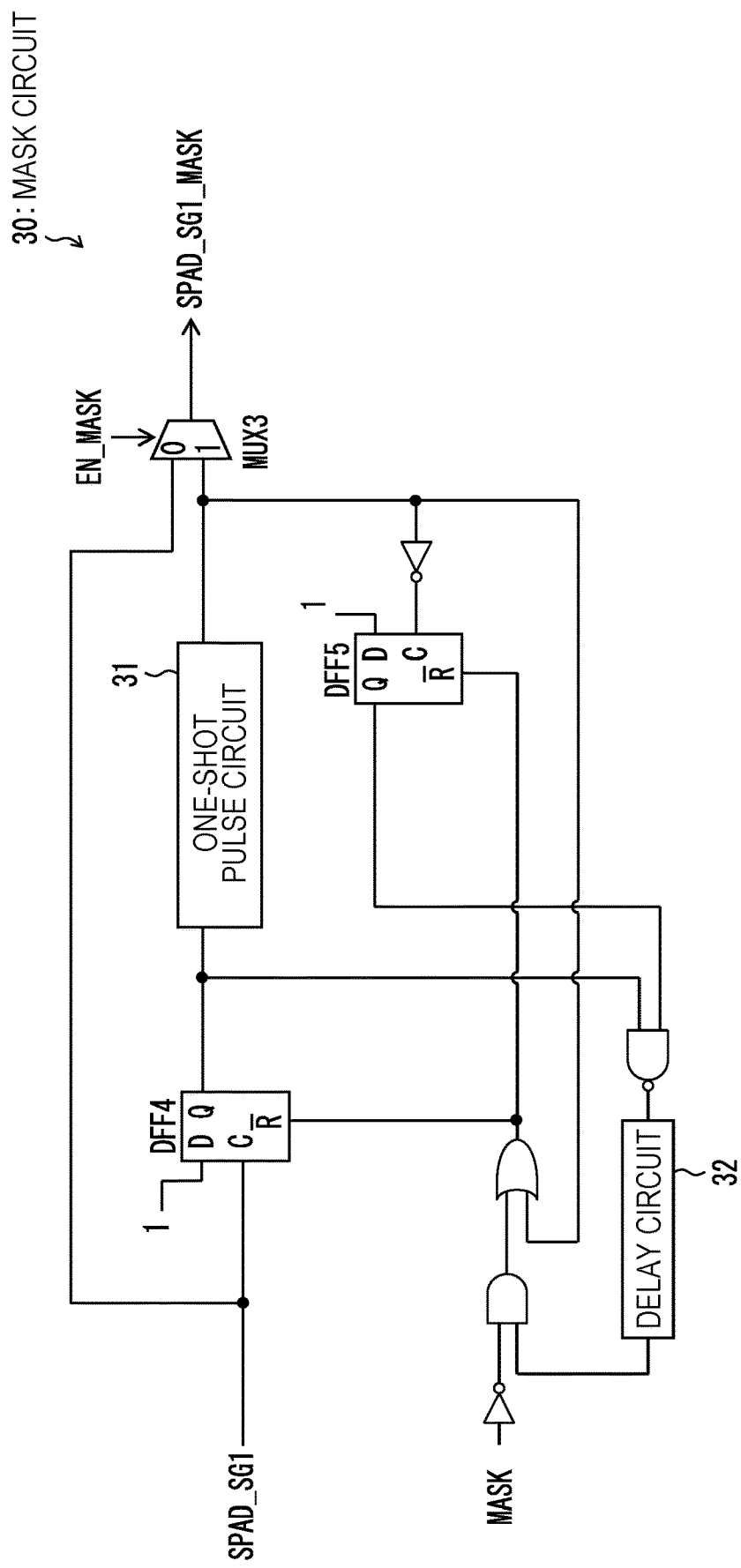
FIG. 20 is a block diagram of a mask circuit that constitutes the optical sensor illustrated in FIG. 15.

FIG. 20 is a block diagram illustrating the schematic configuration of the mask circuit 30.

The mask circuit 30 includes a DFF4, a one-shot pulse circuit 31, a MUX, a DFF5, and a delay circuit 32.

Specifically, when EN_MASK=1 and MASK=0 are satisfied, the mask circuit 30 detects the positive edge of a pulse at a node SPAD_SG1 by the DFF4, and the one-shot pulse circuit 31 outputs a certain pulse width. A pulse having the certain pulse width is output to SPAD_SG1_MASK. When the positive edge of SPAD_SG1 overlaps in a period in which MASK=1 is satisfied, the DFF4 is reset and 0 is output to SPAD_SG1_MASK. When the pulse due to the one-shot pulse circuit 31 remains in the period in which MASK=1 is satisfied, the output SPAD_SG1_MASK is kept at 1 until the pulse reaches 0.

(Mode Determination Processing in Determining Circuit Portion 35 and Reference Pulse Generating Circuit 36)

Figure 21:
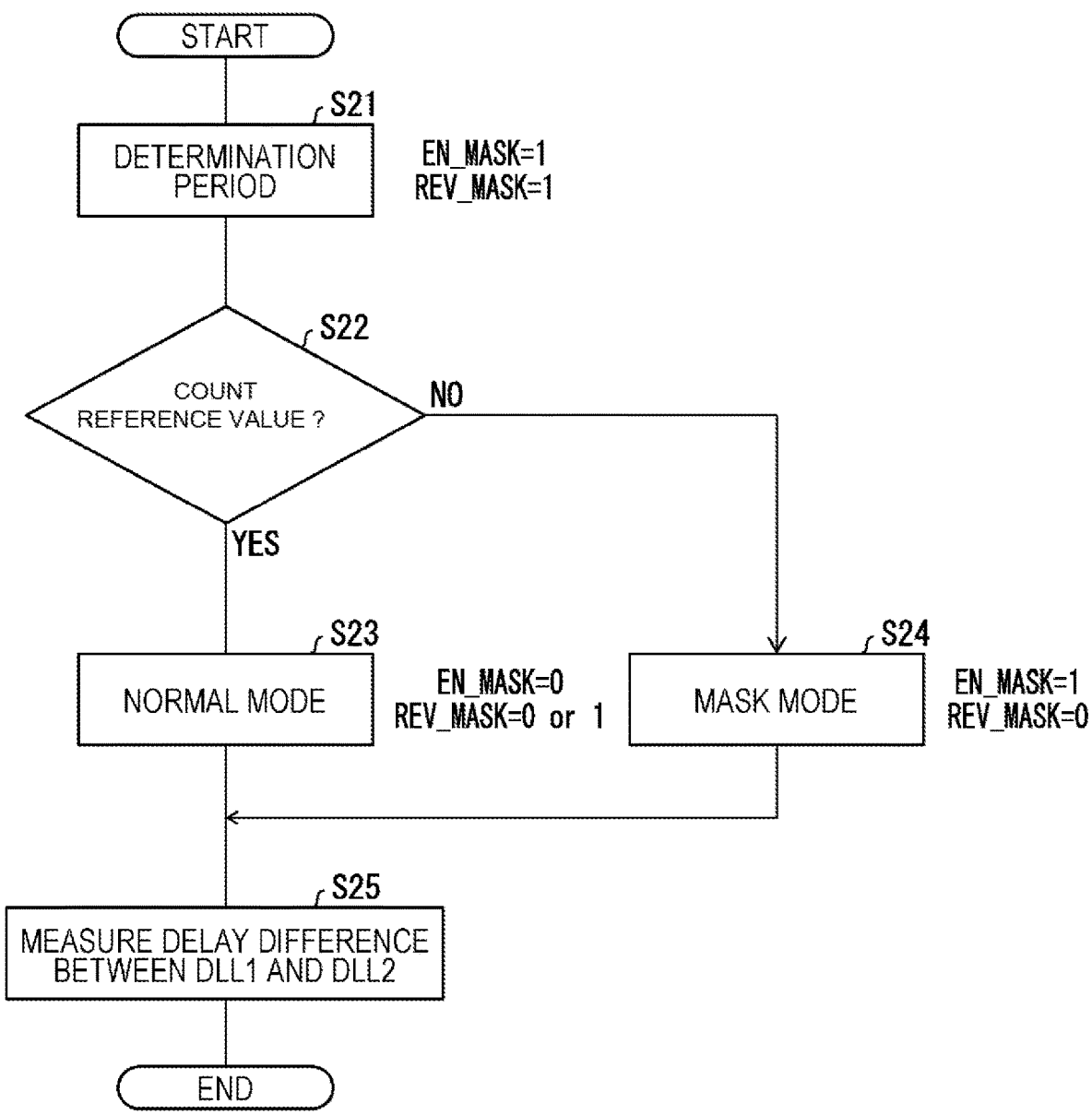
FIG. 21 is a flowchart illustrating the flow of mode determination processing in the optical sensor illustrated in FIG. 15.

FIG. 21 is a flowchart illustrating the flow of determination processing in the determining circuit portion 35.

Unlike the determining circuit portion 15 described in Embodiment 1, the determining circuit portion 35 outputs, as a determination result, REV_MASK and EN_MASK to the reference pulse generating circuit 36. The outputs REV_MASK and EN_MASK are used in the reference pulse generating circuit 36 for determining whether to set the distance measurement mode to the normal mode or a mask mode. Here, when a pulse count with which sufficient measurement accuracy is obtained through acquisition of pulses due to reflected light is defined as a reference value, the normal mode is a mode for performing measurement at short distance at which a count value exceeds the reference value, and the mask mode is a mode for performing measurement at long distance at which a count value falls below the above-mentioned reference value. Thus, in the mask mode, the light-emitting period of the light-emitting element 18 and the period of CLK (reference clock) of the time difference extracting circuit 19 are set longer than those in the normal mode.

The reference pulse generating circuit 36 changes the period of CLK to be output to the time difference extracting circuit 19, depending on the values of the outputs REV_MASK and EN_MASK, and outputs, to the driver 17 configured to drive the light-emitting element 18, the drive signal TX having a content indicating that the light-emitting period of the light-emitting element 18 is to be changed.

As illustrated in FIG. 21, the determining circuit portion 35 first sets a determination period (distance measurement period) (Step S21), and determines whether or not a count value exceeds the reference value in the determination period (Step S22). Here, the determining circuit portion 35 outputs EN_MASK=1 and REV_MASK=1 during the determination period.

Then, when the determining circuit portion 35 determines in Step S22 that the count value exceeds the reference value in the determination period (YES), EN_MASK of 0 and REV_MASK of 0 or 1 are output to the reference pulse generating circuit 36, and the distance measurement mode is set to the normal mode. On the other hand, when the determining circuit portion 35 determines in Step S22 that the count value does not exceed the reference value, that is, falls below the reference value (NO), EN_MASK of 1 and REV_MASK of 0 are output to the reference pulse generating circuit 36, and the distance measurement mode is set to the mask mode. After that, the reference pulse generating circuit 36 changes the period of CLK depending on the values of the outputs REV_MASK and EN_MASK from the determining circuit portion 35, and outputs the resultant to the time difference extracting circuit 19, to thereby achieve measurement of a delay difference between the DLL1 and the DLL2 (Step S25).

Specifically, when a digital value that is output from the first digital calculating portion 13, which performs counting only in a period other than a first mask period that is iterated with the light-emitting period of the light-emitting element 18, does not exceed the reference value in the distance measurement period, the optical sensor is switched to a state in which a pulse from the first light-receiving portion 11 in a period other than a second mask period that is iterated with the half period of the light-emitting period is input to the DLL1 (first DLL). When the digital value exceeds the reference value, the optical sensor is switched to a state in which a pulse from the first light-receiving portion 11 is directly input to the DLL1 (first DLL).

As described above, the determining circuit portion 35 and the reference pulse generating circuit 36 achieve a period changing circuit configured to change, when a pulse count with which sufficient measurement accuracy of a measured distance to the detection target S is obtained is defined as a reference value, the light-emitting period of the light-emitting element 18 and the period of the reference clock of the time difference extracting circuit 19 depending on whether or not a digital value that is output from the first digital calculating portion 13 exceeds the reference value in the distance measurement period.

Figure 22:
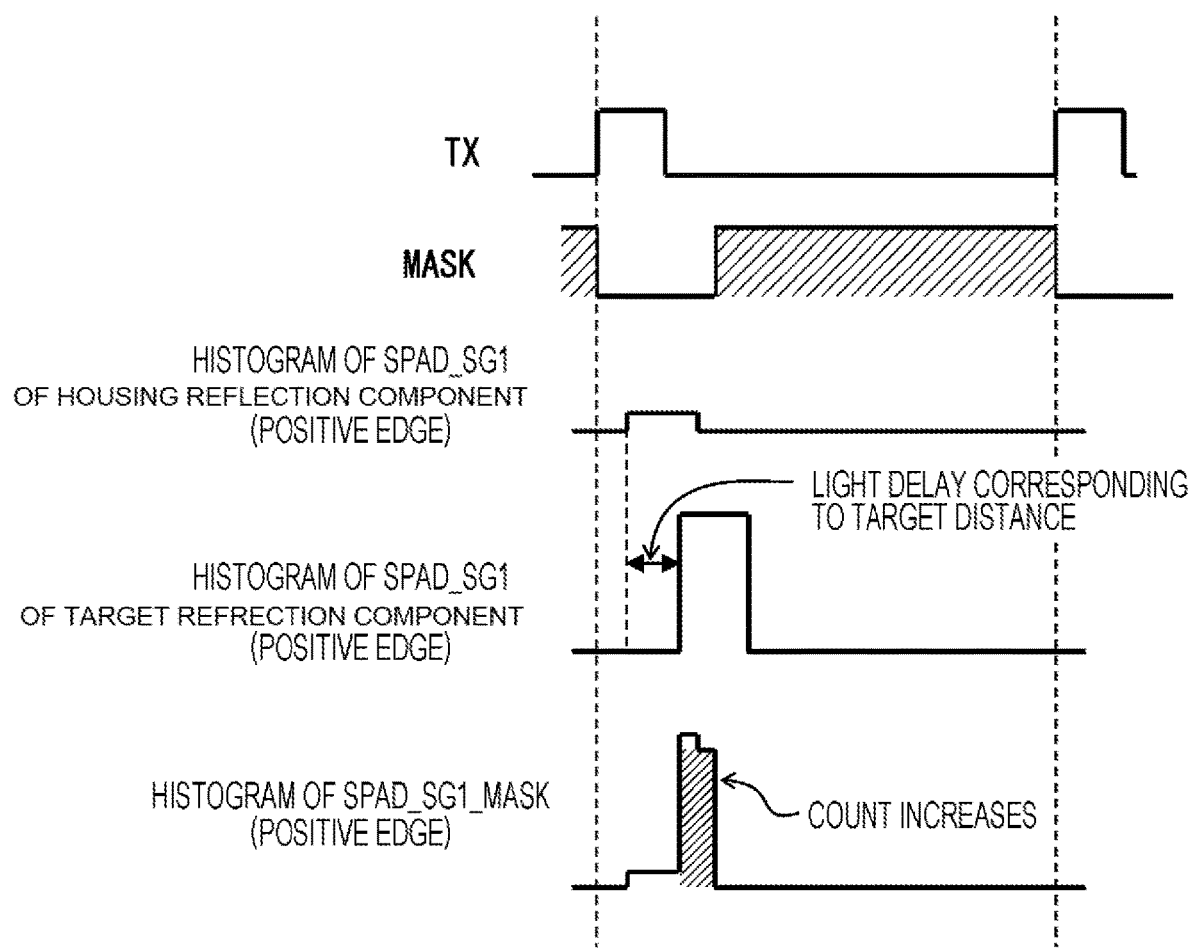
FIG. 22 is a waveform diagram illustrating a condition of transition to the normal mode in the optical sensor illustrated in FIG. 15.

FIG. 22 illustrates an example under a condition under which the optical sensor enters the normal mode through the determination processing described above. When a target is present at close distance, with a light delay that depends on a target distance, the histogram of SPAD_SG1 of the target reflection component overlaps with the histogram of SPAD_SG1 of the housing reflection component. Further, a signal component is large at close distance, and hence the number of histograms of SPAD_SG1 of the target reflection component is sufficiently larger than that of the histograms of SPAD_SG1 of the housing reflection component. As a result, a histogram such as the histogram of SPAD_SG1_MASK illustrated in FIG. 22 is formed. When the reference value is set to a value slightly higher than a pulse due to housing reflection so that the count exceeds the reference value with an increase in count of SPAD_SG1_MASK, the optical sensor is switched to the normal mode under this condition.

Figure 23:
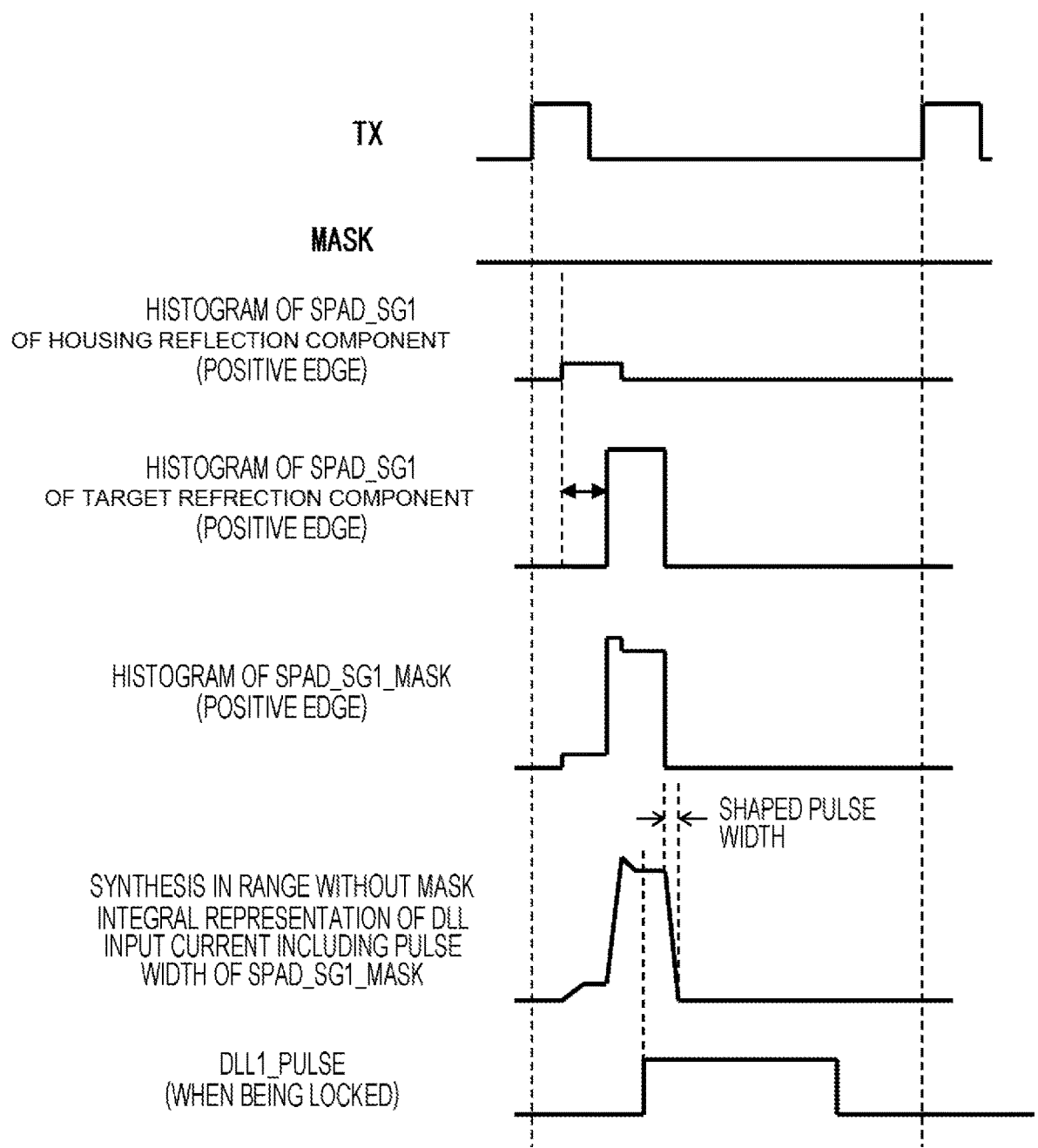
FIG. 23 is a waveform diagram illustrating operation in the normal mode in the optical sensor illustrated in FIG. 15.

Waveforms in the normal mode are illustrated in FIG. 23. Masking is cancelled in the normal mode. Thus, a current integration value in the DLL generated from the pulse of SPAD_SG1_MASK as illustrated in FIG. 23 is obtained, and DLL1_PULSE substantially converges at the center of a current integration value including only the target reflection component.

Figure 24:
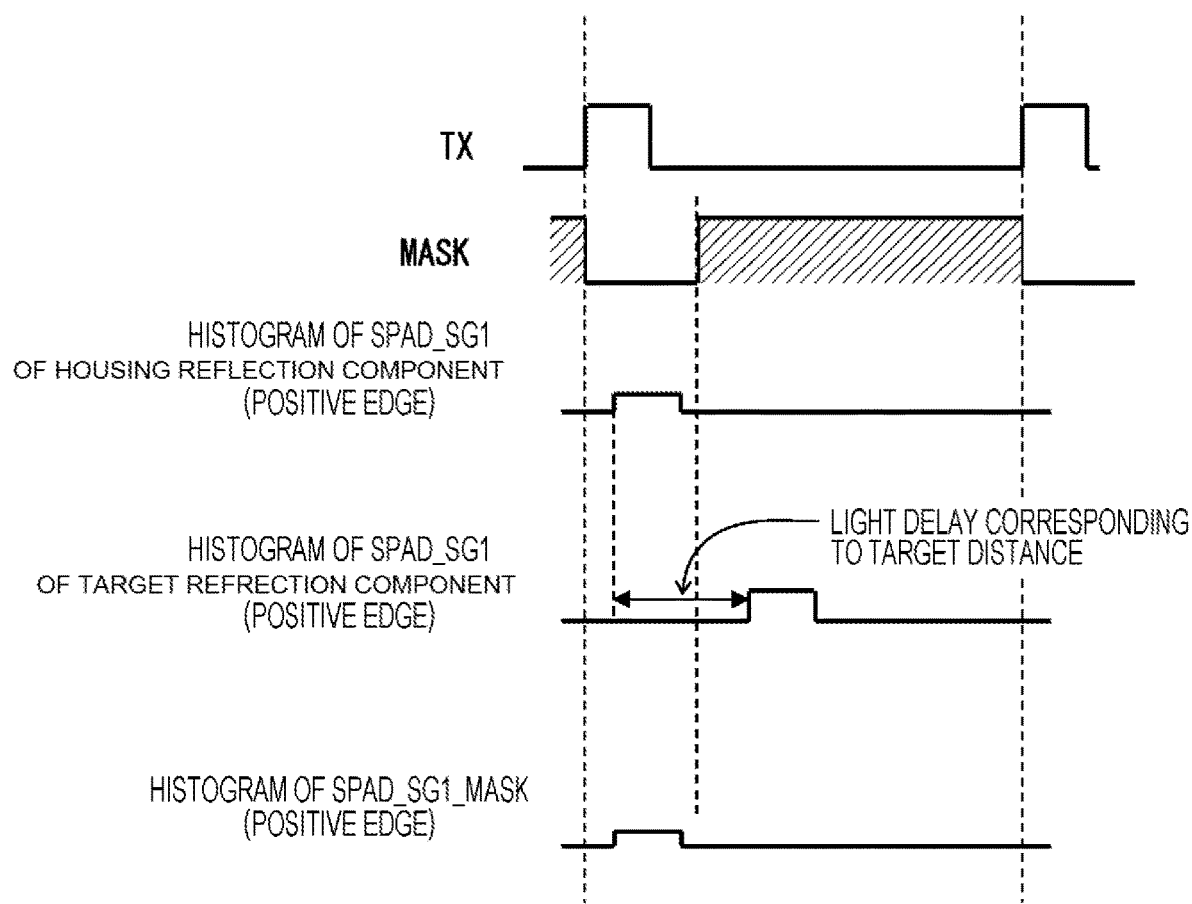
FIG. 24 is a waveform diagram illustrating a condition of transition to the mask mode in the optical sensor illustrated in FIG. 15.

Further, FIG. 24 illustrates an example under a condition under which the optical sensor enters the mask mode. When a target is present at far distance, with a light delay that depends on a target distance, the histogram of SPAD_SG1 of the target reflection component does not overlap with the histogram of SPAD_SG1 of the housing reflection component, and the histograms are located at separate positions. As a result, a histogram only including the housing reflection component, such as the histogram of SPAD_SG1_MASK illustrated in FIG. 24, is formed. The optical sensor is switched to the mask mode when the reference value is set to a value slightly higher than a pulse due to housing reflection so that the count falls below the reference value.

Figure 25:
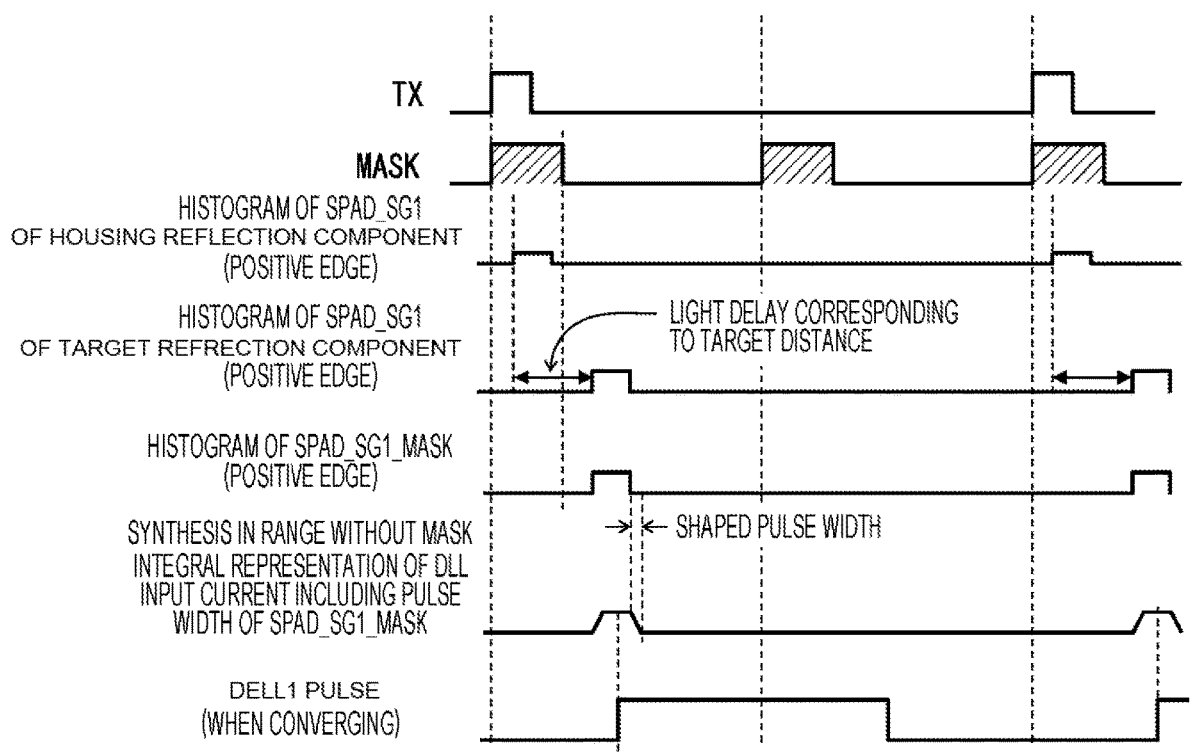
FIG. 25 is a waveform diagram illustrating operation in the mask mode in the optical sensor illustrated in FIG. 15.

Waveforms in the mask mode are illustrated in FIG. 25. In the mask mode, ranges corresponding to the housing reflection component are completely masked. Thus, a current integration value in the DLL generated from the pulse of SPAD_SG1_MASK only including the target reflection component as illustrated in FIG. 25 is obtained, and DLL1_PULSE substantially converges at the center of a current integration value including only the target reflection component. Further, as illustrated in FIG. 25, the period of the pulse of MASK is twice as long as the periods of TX and DLL1_PULSE, and hence the high period and the low period of DLL1_PULSE are equal to each other. Thus, a component of SPAD_SG1 that is generated due to reception of dark pulses or asynchronous light and is uniformly distributed can be removed.

(Effect)

Through the operation described above, the optical sensor 201 illustrated in FIG. 15 can completely remove the housing reflection component at long distance at which an error due to the housing reflection component is large, and perform measurement at short distance.

In this way, in the present invention, both of an increase in measuring distance and a measure against housing reflection can be achieved while accuracy at short distance is kept.

Further, there may be achieved an optical sensor including the period changing circuit (determining circuit portion 15 and reference pulse generating circuit 16) described in Embodiment 1 and the period changing circuit (determining circuit portion 35 and reference pulse generating circuit 36) described in Embodiment 2, in which the period changing circuits are switchable.

Embodiment 3

Another embodiment of the present invention is described below. For convenience of description, members having the same functions as the members described in the above-mentioned embodiments are denoted by the same reference characters and description thereof is omitted.

In the present embodiment, there is described an example of an optical sensor having the same configuration as the optical sensor 101 according to Embodiment 1, in which a DLL1 and a DLL2 in the time difference extracting circuit 19 and a reference pulse generating circuit have different configurations from Embodiment 1.

(Configuration of DLL1 and DLL2)

Figure 26:
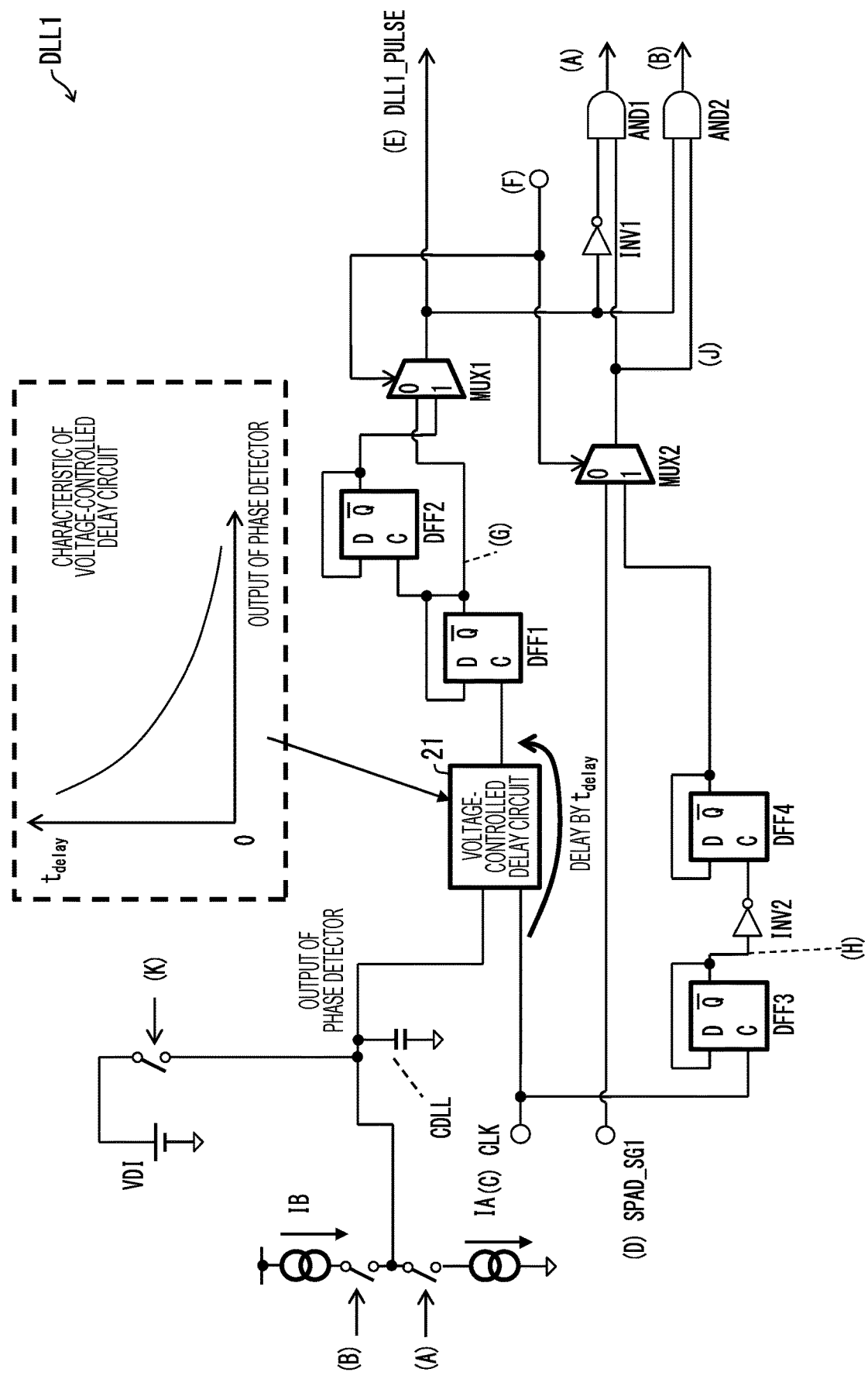
FIG. 26 is a block diagram of a DLL that constitutes an optical sensor according to Embodiment 3 of the present invention.

FIG. 26 is a circuit diagram of the DLL1 and the DLL2 of the optical sensor according to the present embodiment. The DLL1 and the DLL2 illustrated in FIG. 26 operate in the same manner as the DLL1 and the DLL2 described in Embodiment 1 when (F)=0 is satisfied. When (F)=1 is satisfied, a signal from the light-receiving portion is cut by a MUX2, and a pulse obtained by ¼ frequency-dividing the pulse of (C) CLK by the DFF3, an INV2, and the DFF4 is the waveform of (J). Further, a normal output (G) of the DFF1 is cut by a MUX1, and a pulse obtained by ½ frequency-dividing (G) by a DFF2 is output to (E) DLL_PULSE. Further, when (K)=1 is satisfied, a voltage VDI at the voltage-controlled delay circuit 21 is a voltage at the CDLL.

(Overview of Reference Pulse Generating Circuit 46)

Figure 27:
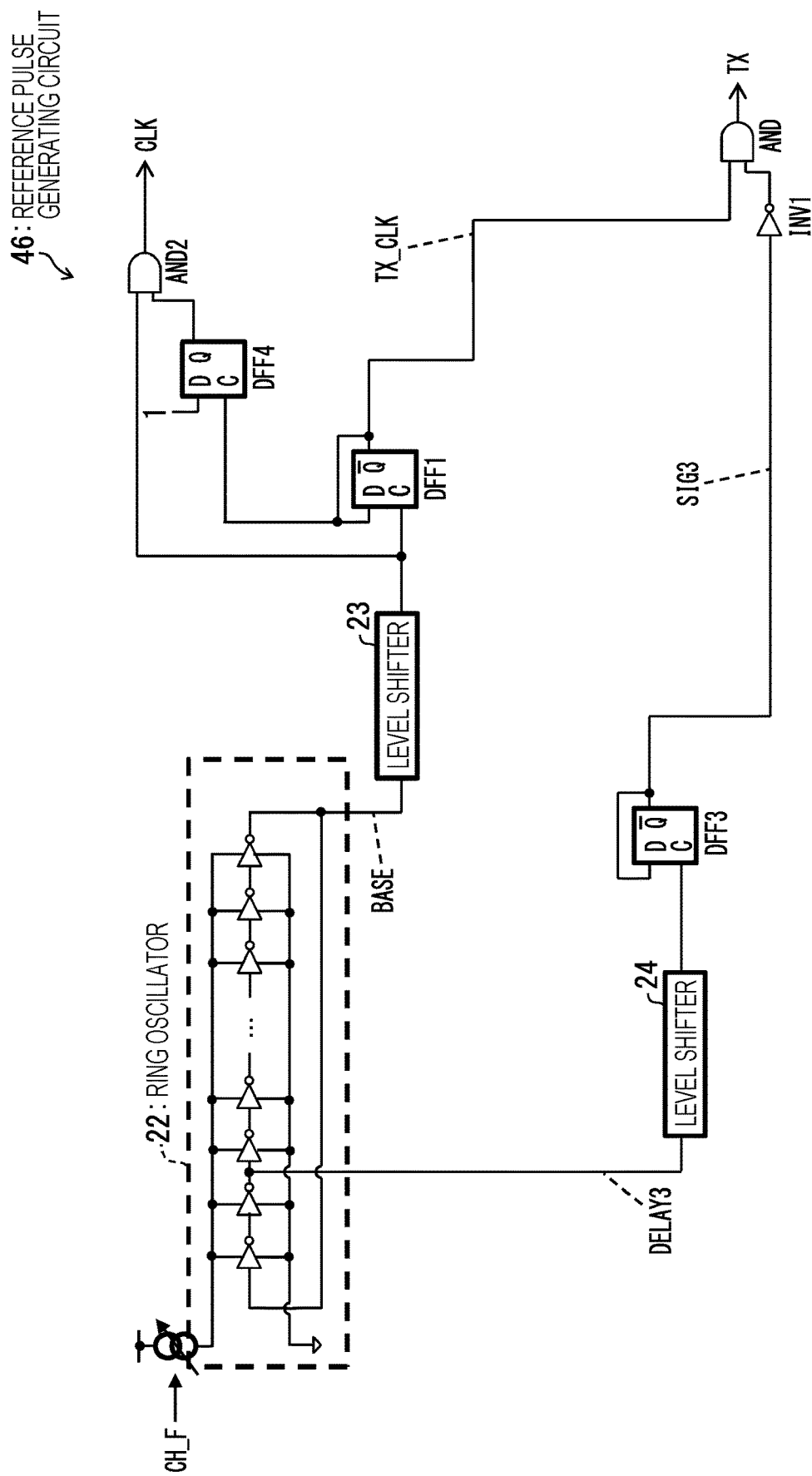
FIG. 27 is a block diagram of a reference pulse generating circuit that constitutes the optical sensor according to Embodiment 3 of the present invention.

FIG. 27 is a circuit diagram illustrating a reference pulse generating circuit 46. As illustrated in FIG. 27, the reference pulse generating circuit 46 is obtained by adding the DFF4 and the AND2 to the reference pulse generating circuit 16 of Embodiment 1, which is illustrated in FIG. 6. When the DFF1, the DFF3, and the DFF4 each have an initial value Q of 0, the DFF4 outputs 1 at a timing at which the DFF1 falls so that CLK has a pulse that is delayed from TX_CLK by the half period of TX_CLK.

Figure 28:
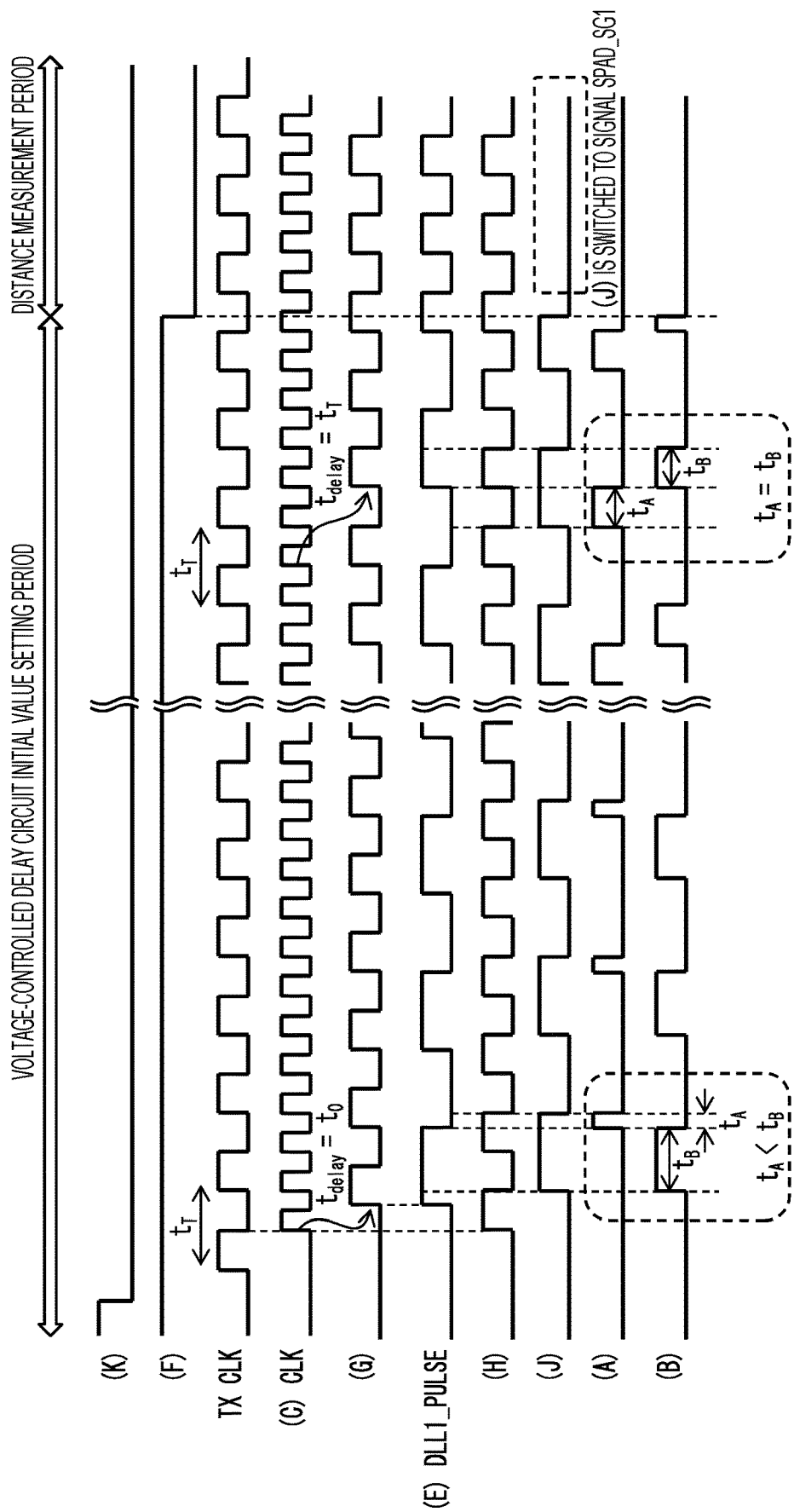
FIG. 28 is a waveform diagram illustrating initial value setting of the DLL illustrated in FIG. 26.
Figure 29:
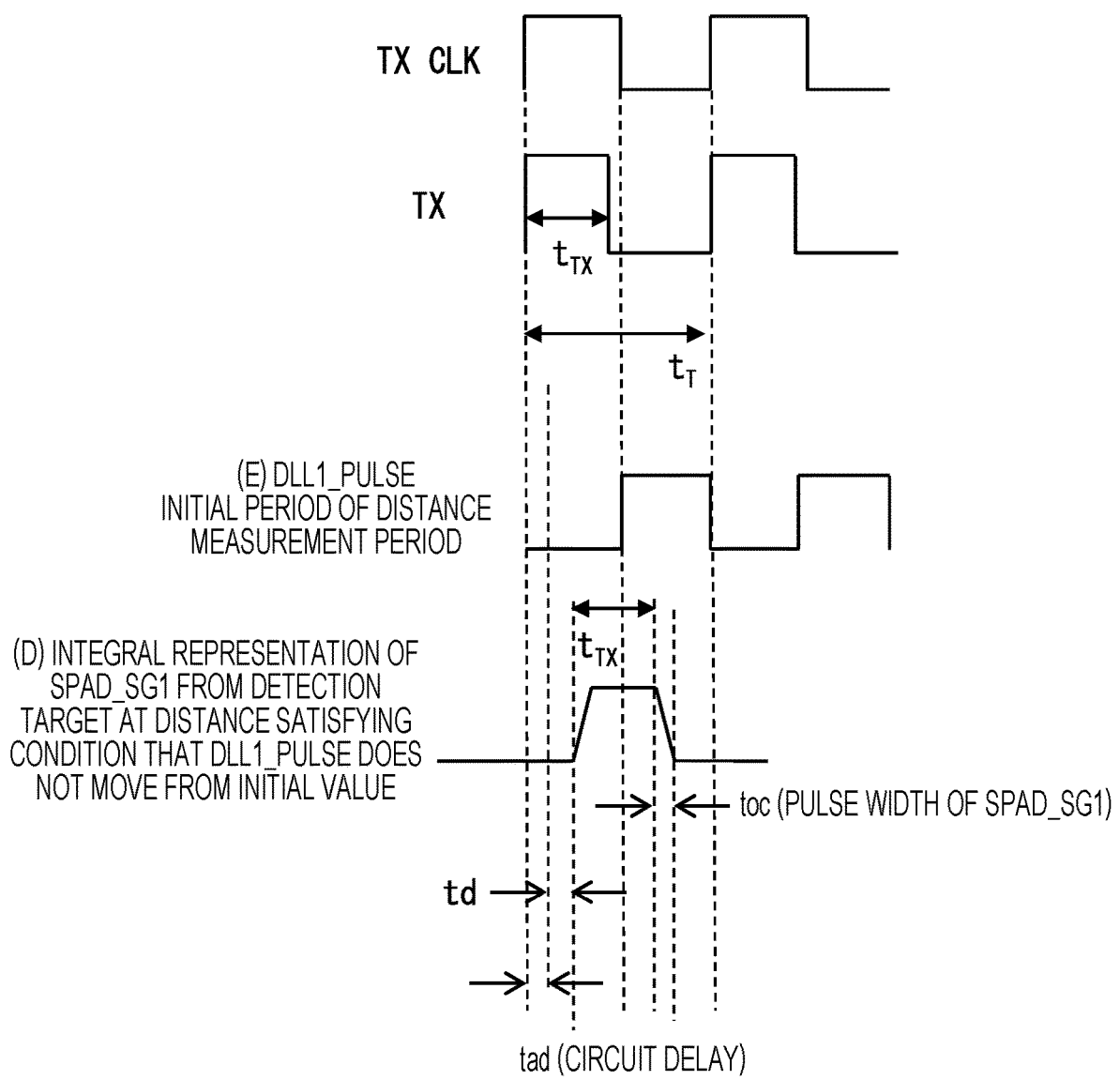
FIG. 29 is a waveform diagram illustrating a relationship between an initial value of the DLL illustrated in FIG. 26 and a delay corresponding to the detection target.

The configuration of the DLL1 and the DLL2 illustrated in FIG. 26 and the configuration of the reference pulse generating circuit 46 illustrated in FIG. 27 allow an initial value of the voltage-controlled delay circuit 21 to be set as illustrated in FIG. 28. As illustrated in FIG. 28, a period in which (K)=1 is satisfied is provided in an initial period of a voltage-controlled delay circuit initial value setting period, and a delay time $t_{delay}$ of the voltage-controlled delay circuit 21 is set to t0. After that, when the pulse of TX_CLK starts, a (C) CLK ¼ frequency-divided signal obtained by delaying (C) CLK by one period of (C) CLK is output to (J), and a signal obtained by ½ frequency-dividing a normal delay circuit output is output to (E) DLL1_PULSE. Times at which IB and IA are generated by (E) DLL1_PULSE and (J) satisfy tA<tB, and $t_{delay}$ operates in a delay direction. At the end of the voltage-controlled delay circuit initial value setting period, tA=tB is satisfied and $t_{delay}$ is locked to $t_T$ that is the period of TX_CLK. After $t_{delay}$ is locked, the distance measurement period arrives and (F) is set to 0 so that the DLL1 normally operates. In an initial period of the distance measurement period, (C) CLK is delayed from TX_CLK by a half period, and hence when $t_{delay}$·v=$t_T$ is satisfied, the rising edge of (E) DLL1_PULSE is delayed by a half period with reference to the rising edge of TX_CLK. The initial value of a delay time td corresponding to this state is expressed as follows from the waveform diagram of FIG. 29.

$$td=t_T-(t_{TX}+t_{oc})/2-tad$$

$t_{TX}$: pulse width of TX
$t_{oc}$: pulse width of SPAD_SG1
tad: delay time from TX to light-emitting element
(Effect)

In the present embodiment, the voltage-controlled delay circuit 21 can calculate the degree of change from an initial value to a delay corresponding to a distance to an object to be detected, and hence even when the voltage-controlled delay circuit initial value setting period varies, an initial delay at measurement start is not changed and calculation can be performed in a similar manner. An appropriate measurement time can thus be set, and there is provided an effect that the measurement time can be reduced.

Embodiment 4

Another embodiment of the present invention is described below. For convenience of description, members having the same functions as the members described in the above-mentioned embodiments are denoted by the same reference characters and description thereof is omitted.
(Overview of Optical Sensor)

Figure 30:
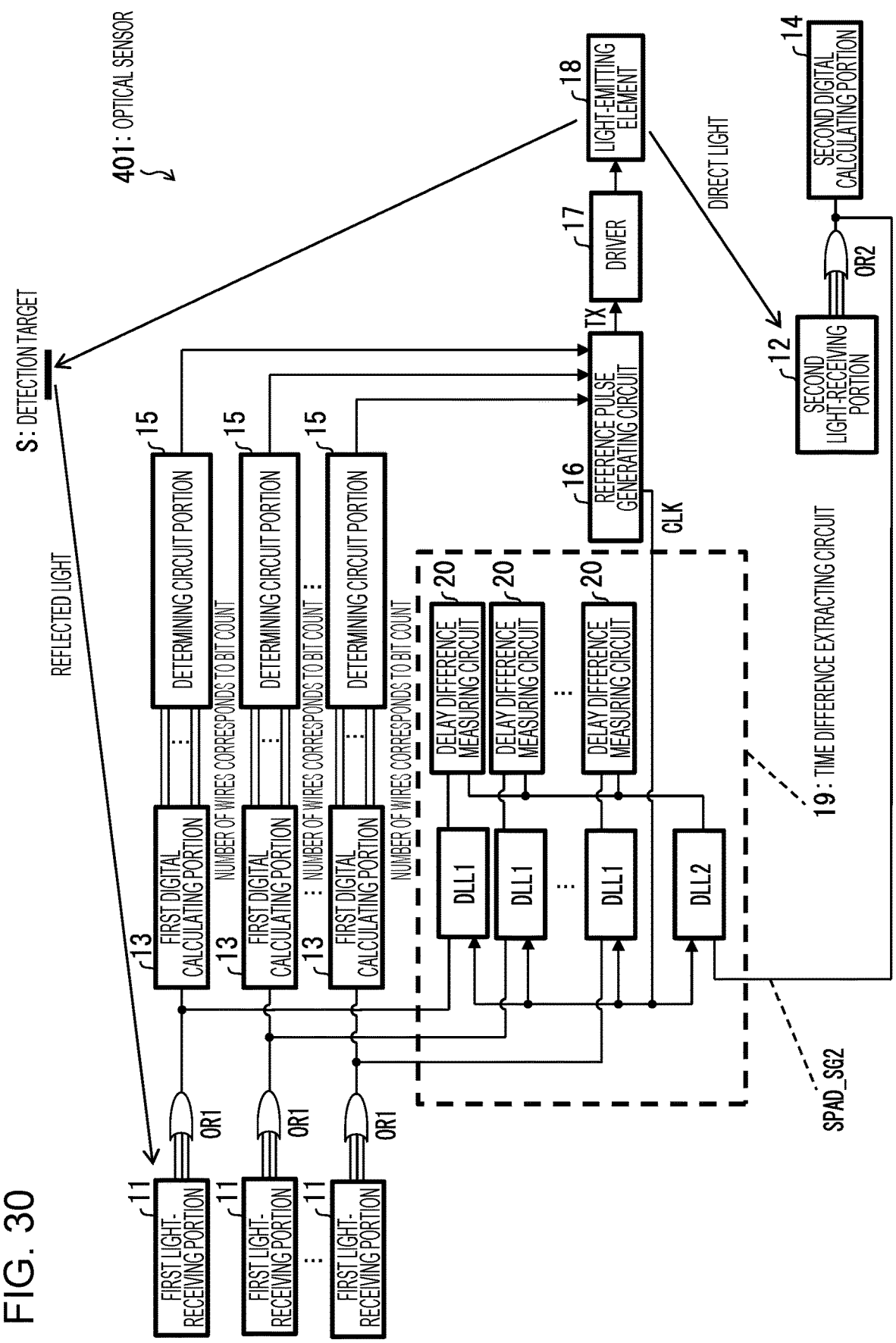
FIG. 30 is a block diagram of an optical sensor according to Embodiment 4 of the present invention.
Figure 31:
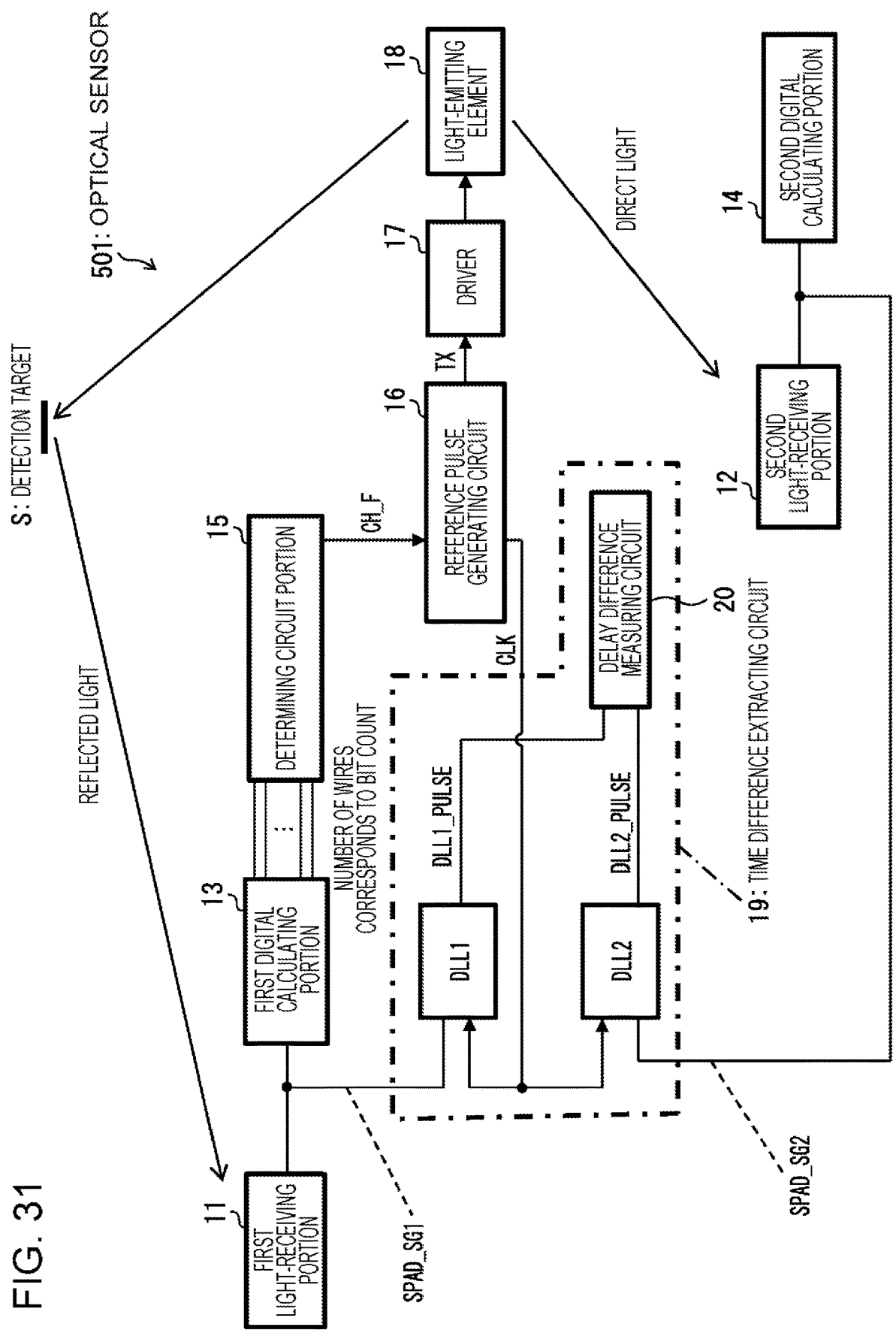
FIG. 31 is a block diagram of an optical sensor according to Embodiment 5 of the present invention.

FIG. 30 is a block diagram illustrating the schematic configuration of an optical sensor 401 according to the present embodiment.

The optical sensor 401 basically has the same configuration as the optical sensor 101 of Embodiment 1 but is different from the optical sensor 101 in that, as illustrated in FIG. 30, the optical sensor 401 includes a plurality of first light-receiving portions 11 and the same number of first digital calculating portions 13, determining circuit portions 15, and DLL1s and delay difference measuring circuits 20 in the time difference extracting circuit 19 as the first light-receiving portions 11. As in the optical sensor 101 of Embodiment 1, for a signal from the second light-receiving portion 12, the DLL2 in the time difference extracting circuit 19 is used in order to determine a delay difference independently of signals from the plurality of first light-receiving portions 11.

With the optical sensor 401 having the above-mentioned configuration, the plurality of first light-receiving portions 11 configured to receive reflected light from the detection target S are provided. Thus, the optical sensor 401 is advantageous in measuring distances on the basis of angles of incidence of the reflected light, for example. With a plurality of light-receiving portions, three-dimensional distance information on light having different angles of incidence can be measured in one go, for example, and there is provided an effect that the measurement time can be reduced.

Embodiment 5

Another embodiment of the present invention is described below. For convenience of description, members having the same functions as the members described in the above-mentioned embodiments are denoted by the same reference characters and description thereof is omitted.
(Overview of Optical Sensor)

Figure 33:
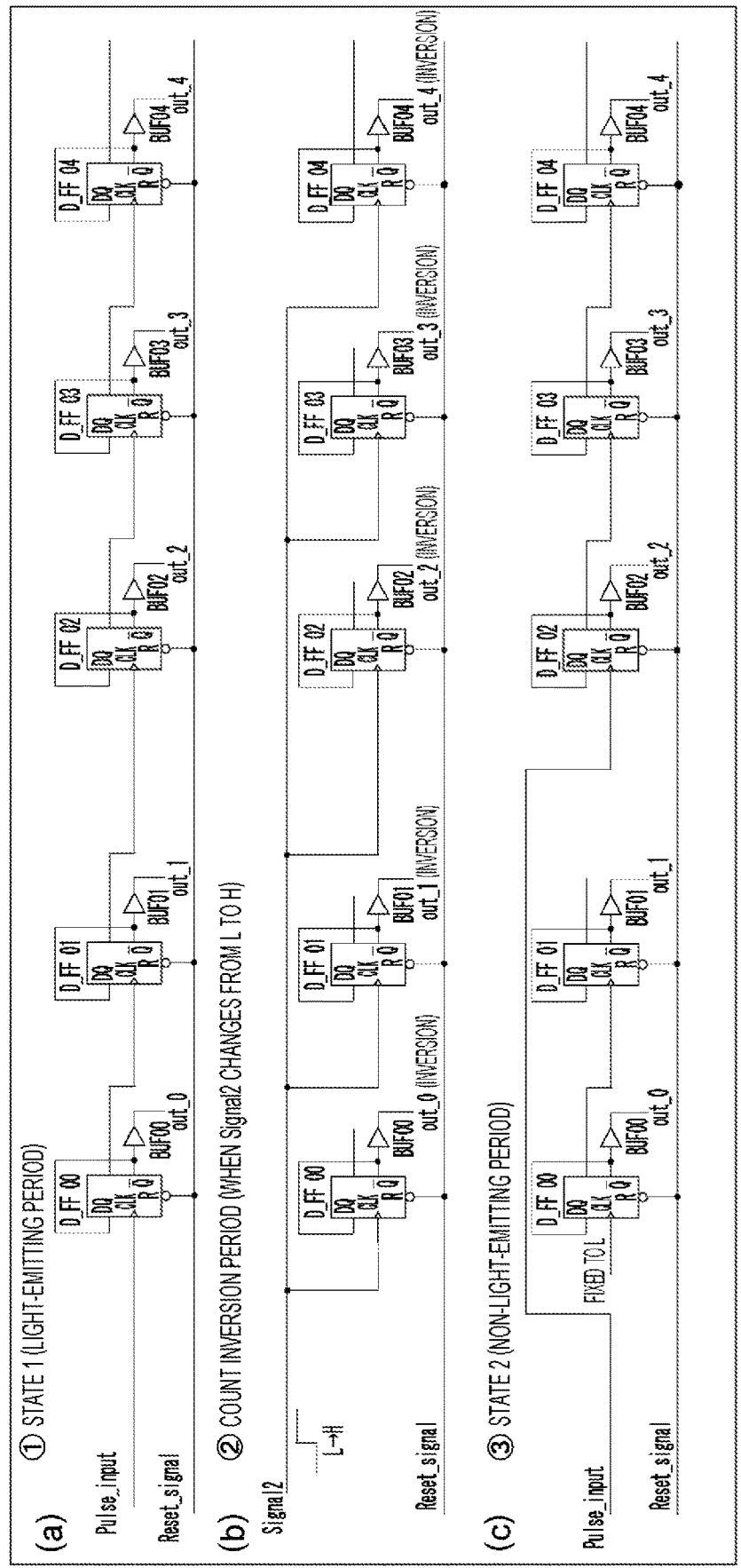
FIG. 33 is a diagram for explaining operation of the digital calculating portion circuit.
Figure 34:
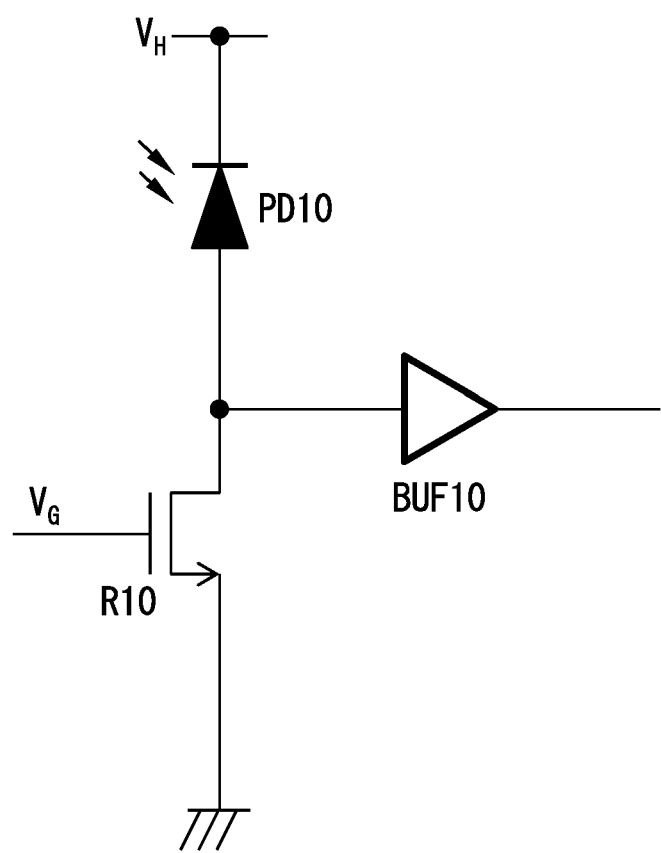
FIG. 34 is a diagram of a binary output circuit of a SPAD.

FIG. 33 is a block diagram illustrating the schematic configuration of an optical sensor 501 according to the present embodiment.

The optical sensor 501 basically has the same configuration as the optical sensor 101 of Embodiment 1 but is different from the optical sensor 101 in that the first light-receiving portion 11 and the second light-receiving portion 12 each include one CELL of Embodiment 1, which is illustrated in FIG. 2.
(Effect)

In this way, the first light-receiving portion 11 and the second light-receiving portion 12 each include one CELL illustrated in FIG. 2, and hence the areas of the light-receiving portions are reduced. An increase in area can be prevented when a plurality of first light-receiving portions 11 are arranged as in the optical sensor 401 of Embodiment 4, for example. In addition, the first light-receiving portion 11 and the second light-receiving portion 12 each include one CELL, and hence the OR1 and an OR2 are unnecessary. This means that there is also provided an effect that the configuration of the optical sensor can be simplified.

The first digital calculating portion 13 and the second digital calculating portion 14, which are not described in detail in Embodiments 1 to 5, have the same configuration throughout the embodiments. The first digital calculating portion 13 and the second digital calculating portion 14 are described in detail below.
(First Digital Calculating Portion 13 and Second Digital Calculating Portion 14)

Figure 32:
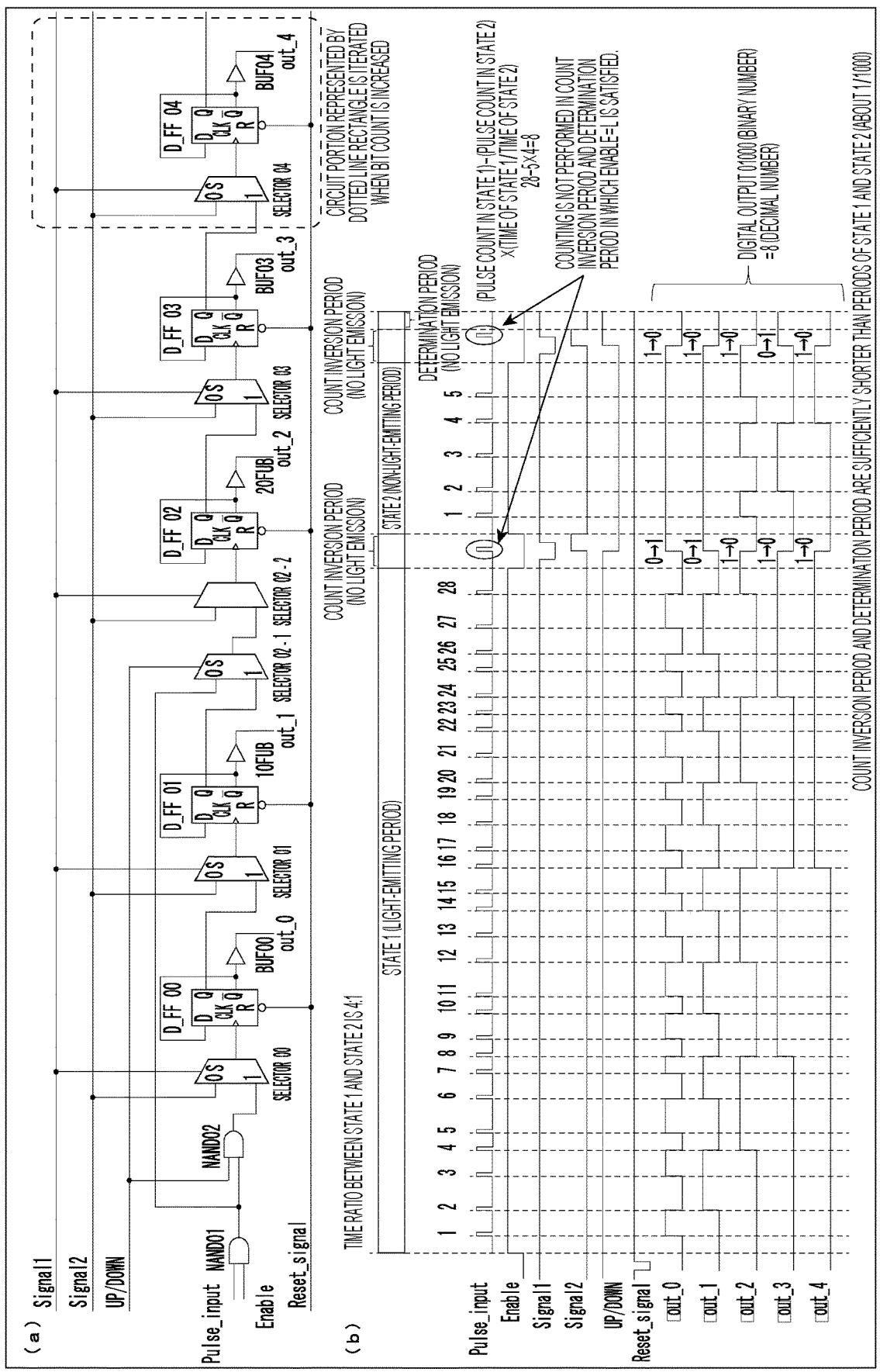
FIG. 32 is a diagram for explaining operation of a digital calculating portion circuit.

(a) of FIG. 32 is a diagram of a circuit in the first digital calculating portion 13 and the second digital calculating portion 14. (b) of the same drawing is a drive waveform diagram of the first digital calculating portion 13 and the second digital calculating portion 14. FIG. 33 is a circuit diagram illustrating operation of the first digital calculating portion 13 and the second digital calculating portion 14 when the optical sensor is in each state.

The first digital calculating portion 13 and the second digital calculating portion 14 have the same configuration, and hence are referred to as digital calculating portion in the following description. Further, here, description is given on a case where the ratio between the first state, in which the light-emitting element 18 iteratively emits pulses, and the second state, in which the light-emitting element 18 emits no pulse, in the pulse acquisition period is 4:1, and the number of bits connected to the determining circuit portion 15 is 5.

The digital calculating portion is a circuit configured to count pulses input to a Pulse_input terminal in a period in which an Enable terminal is at H. Before pulse acquisition, a Reset_signal terminal is changed as H→L→H, and hence digital calculation outputs of 5 bits (out_0, out_1, out_2, out_3, and out_4) are reset to 0 (=L). Then, pulse acquisition starts.

In the first state, Enable=H, Signal1=H, Signal2=L, and UP/DOWN=H are satisfied, and a circuit configuration that counts pulses input to the Pulse_input terminal ((a) of FIG. 33) is obtained. A short count inversion period is necessary between the first state and the second state, and Signal1, Signal2, and UP/DOWN are changed in the period.

The count inversion period is sufficiently shorter than the periods of the first state and the second state (about 1/1000). In the count inversion period, Enable=L is satisfied and no pulse is input to the digital calculating portion. Further, the light-emitting element emits no pulse. As illustrated in (b) of FIG. 33, in the count inversion period, D_FF and D_FF between the bits are separated from each other, and all bits are inverted when Signal2 is changed as L→H.

In the second state, Enable=H, Signal1=H, Signal2=L, and UP/DOWN=L are satisfied, and subtraction of a pulse count input to the Pulse_input terminal is performed. A circuit configuration at this time is the same as the configuration of (a) of FIG. 33 except for that, as illustrated in (c) of FIG. 33, input starts from the third bit (out_2) and the first bit and the second bit (out_0 and out_1) are not changed. In the operation, counting of pulses starts from the third bit.

A case where 28 pulses are input in the first state and 5 pulses are input in the second state, which is illustrated in (b) of FIG. 32, is described below as an example.
out_4, out_3, out_2, out_1, and out_0 are described in this order. (H voltage is 1 and L voltage is 0)
First state: 11100 (binary number) (=28 (decimal number))
↓
Count inversion period: inversion of each bit: 00011
↓
Second state: 00011 is shifted by 2 bits to the higher-order bit side and 5 is added
   10111 (higher-order 3 bits are changed as 000(0)→101 (5))
↓
Count inversion period: inversion of each bit: 01000 (binary number) (=8 (decimal number))
(pulse count in first state)−(pulse count in second state)× (time of first state/time of second state)=28−5×4=8
The above-mentioned calculation is performed.

In the second state, addition in bit inversion is equivalent to subtraction when the bits are returned to the original, and addition of a pulse that is input while being shifted by i bits (i is a variable) to the higher-order bit side is equivalent to multiplication of the addition value by 2 to the power of i. In the example, the time of the first state is four times the time of the second state, and hence addition is performed with 2-bit shift in the second state.

(Electronic Device)

The optical sensors according to Embodiments 1 to 5 may each be built in an electronic device. Specific examples of such an electronic device include cameras, robot vacuum cleaners, and smartphones.

CONCLUSION

The optical sensor (101, 201, 401, or 501) according to Aspect 1 of the present invention includes: the light-emitting element 18; the first light-receiving portion 11 of a photon counting type configured to output a pulse in synchronization with the incidence of a photon due to reflected light from the body (detection target S); the second light-receiving portion 12 of the photon counting type placed near the light-emitting element 18 and configured to output a pulse in synchronization with the incidence of a photon due to reflected light from inside the sensor package; the time difference extracting circuit 19 configured to extract a time difference corresponding to distance on a spatial optical path by using pulse output from the first light-receiving portion and the second light-receiving portion (11 or 12), and a reference clock; the first digital calculating portion 13 configured to count pulses in the pulse output from the first light-receiving portion 11 and output a digital value; and the period changing circuit (determining circuit portion 15, reference pulse generating circuit 16, determining circuit portion 35, and reference pulse generating circuit 36) configured to change, when a pulse count with which sufficient measurement accuracy of a measured distance to the body (detection target S) is obtained is defined as a reference value, a light-emitting period of the light-emitting element 18 and a period of the reference clock depending on whether or not the digital value that is output from the first digital calculating portion 13 exceeds the reference value in the distance measurement period (determination period).

With the above-mentioned configuration, when a pulse count with which sufficient measurement accuracy of a measured distance to the body is obtained is defined as a reference value, the light-emitting period of the light-emitting element and the period of the reference clock are changed depending on whether or not the digital value that is output from the first digital calculating portion exceeds the reference value in the distance measurement period, and hence an appropriate light-emitting period of the light-emitting element and an appropriate period of the reference clock can be set for each of a case where a distance to the body, which is the measurement target, is short distance and a case where the distance is long distance. In particular, the light-emitting period of the light-emitting element and the period of the reference clock can be set in consideration of a case where a housing panel is present between the body, which is the detection target, and the optical sensor.

With this, both of measurement accuracy at short distance and measurement accuracy at long distance when the housing panel is present between the body and the optical sensor can be maintained.

With regard to the optical sensor 101 according to Aspect 2 of the present invention, in Aspect 1 above, the period changing circuit (determining circuit portion 15 and reference pulse generating circuit 16) may change, when it is determined that the digital value that is output from the first digital calculating portion 13 exceeds the reference value in the distance measurement period (determination period), each of the light-emitting period of the light-emitting element 18 and the period of the reference clock to a period multiplied by a number set in advance.

With the above-mentioned configuration, when it is determined that the digital value that is output from the first digital calculating portion 13 exceeds the reference value in the distance measurement period (determination period), specifically, when it is determined that a distance to the body is short distance, the light-emitting period of the light-emitting element 18 and the period of the reference clock are each changed to a period multiplied by a number set in advance, and hence a measurement error at short distance can be reduced.

With regard to the optical sensor 201 according to Aspect 3 of the present invention, in Aspect 1 above, the time difference extracting circuit 19 may include the first DLL (DLL1) configured to receive the pulse output from the first light-receiving portion 11, and the second DLL (DLL2) configured to receive the pulse output from the second light-receiving portion 12, and the period changing circuit (determining circuit portion 35 and reference pulse generating circuit 36) may perform switching, when the digital value that is output from the first digital calculating portion 13, which performs counting only in a period other than the first mask period that is iterated with the light-emitting period of the light-emitting element 18, does not exceed the reference value in the distance measurement period (determination period), to the state in which a pulse from the first light-receiving portion 11 in a period other than the second mask period that is iterated with the half period of the light-emitting period is input to the first DLL (DLL1), and perform switching to the state in which a pulse from the first light-receiving portion 11 is directly input to the first DLL (DLL1) when the digital value exceeds the reference value.

With the above-mentioned configuration, when the housing panel is present between the body and the optical sensor, a housing reflection component can be completely removed, and hence measurement accuracy at long distance at which an error due to the housing reflection component is large can be achieved.

With regard to the optical sensor (101 or 201) according to Aspect 4 of the present invention, in Aspect 3 above, the first DLL and the second DLL (DLL1 and DLL2) may each include the phase detector, the voltage-controlled delay circuit 21, and the capacitor CDLL configured to hold the control voltage for the voltage-controlled delay circuit 21, and the first DLL and the second DLL each may charge the capacitor CDLL to a certain value in the first period, input, to the phase detector, a clock obtained by ¼ frequency-dividing a reference clock of the voltage-controlled delay circuit 21, and a ¼ frequency-divided output of the voltage-controlled delay circuit 21 in the second period, and input, to the phase detector, a pulse from the first light-receiving portion 11 and a clock obtained by ½ frequency-dividing output of the voltage-controlled delay circuit 21 in the third period.

With the above-mentioned configuration, an ambient light component included in a measured value can be removed.

An optical sensor according to Aspect 5 of the present invention includes: the period changing circuit (determining circuit portion 15 and reference pulse generating circuit 16) according to Aspect 2 above; and the period changing circuit (determining circuit portion 35 and reference pulse generating circuit 36) according to Aspect 3 above, in which the period changing circuits are switchable.

With the above-mentioned configuration, both of an increase in measuring distance and a measure against housing reflection can be achieved while accuracy at short distance is kept.

With regard to the optical sensor according to Aspect 6 of the present invention, in any one of Aspects 1 to 5 above, the light-emitting element 18 may have the two states of the first state in which the light-emitting element 18 iteratively emits a pulse and the second state in which the light-emitting element 18 emits no light in the period in which pulses are acquired from the first light-receiving portion and the second light-receiving portion (11 and 12), the light-emitting element 18 may iteratively operate with one period that is a period that arrives at a certain time ratio at which the first state and the second state satisfy time of first state>time of second state, the digital calculating portions (first digital calculating portion 13 and second digital calculating portion 14) for the first light-receiving portion and the second light-receiving portion (11 and 12) may each count pulses in the first state and subtract a value obtained by multiplying a pulse count by a coefficient of (time of first state/time of second state) in one period in the second state, and every time n periods (n≥1) are ended, the digital value that is output from the first digital calculating portion 13 for the first light-receiving portion 11 may be input to the first determining circuit portion (determining circuit portion 15), and it may be determined whether the digital value exceeds the first reference value.

With the above-mentioned configuration, a valid data count (pulse count due to reflected light component) of the TOF sensor can be grasped every time the n periods (n≥1) are ended, and the pulse acquisition period can be ended as soon as a necessary and sufficient data count is acquired. This reduces the measurement time to the minimum, and highly accurate measurement can thus be carried out in a short time.

An electronic device according to Aspect 7 of the present invention includes the optical sensor according to any one of Aspects 1 to 5 above.

An optical sensor according to Aspect 8 of the present invention includes: a light-emitting element; a first light-receiving portion of a photon counting type configured to output a pulse in synchronization with the incidence of a photon due to reflected light from a body; a light-receiving portion 2 of the photon counting type placed near the light-emitting element and configured to output a pulse in synchronization with the incidence of a photon due to reflected light from inside a sensor package; a time difference extracting circuit configured to extract a time difference between pulse output from the first light-receiving portion and pulse output from the second light-receiving portion; a first digital calculating portion configured to count pulses in the pulse output from the first light-receiving portion and output a digital value; a digital calculating portion 2 configured to count pulses in the pulse output from the second light-receiving portion and output a digital value; a determining circuit portion configured to determine whether the digital value that is output from the first digital calculating portion exceeds a reference value; a driver circuit configured to pulse-drive the light-emitting element; and a reference pulse generating circuit configured to give a reference pulse to the driver circuit and give a reference clock to the time difference extracting circuit. The determining circuit portion includes a processing circuit configured to change, when the digital value that is output from the first digital calculating portion exceeds the reference value, each of a light-emitting period and a period of the reference clock of the time difference extracting circuit to a period multiplied by a set number, and the number of each of the light-receiving portions 1, the digital calculating portions 1, and the determining circuit portions is at least one.

The optical sensor according to Aspect 9 of the present invention, in Aspect 8 above, the time difference extracting circuit may include a first DLL configured to receive the pulse output from the first light-receiving portion, and a second DLL configured to receive the pulse output from the second light-receiving portion, and the processing circuit may perform switching, when the digital value that is output from the digital calculating portion, which performs counting only in a period other than a first mask period that is iterated with the light-emitting period of the light-emitting element, does not exceed the reference value, to a state in which a pulse from the first light-receiving portion in a period other than a second mask period that is iterated with a half period of the light-emitting period is input to the first DLL, and perform switching to a state in which a pulse from the light-emitting element is directly input to the first DLL when the digital value exceeds the reference value.

With regard to the optical sensor according to Aspect 10 of the present invention, in Aspect 8 or 9 above, the first DLL and the second DLL may each include a phase detector, a voltage-controlled delay circuit, and a capacitive element configured to hold a control voltage for the voltage-controlled delay circuit, and the first DLL and the second DLL each may charge the capacitive element to a certain value in a first period, input, to the phase detector, a clock obtained by ¼ frequency-dividing a reference clock of the voltage-controlled delay circuit, and a ¼ frequency-divided output of the voltage-controlled delay circuit in a second period, and input, to the phase detector, a pulse from the first light-receiving element or second light-receiving element and a clock obtained by ½ frequency-dividing output of the voltage-controlled delay circuit in a third period.

With regard to the optical sensor according to Aspect 11 of the present invention, the processing circuit of Aspect 8 above and the processing circuit of Aspect 9 above may be switched.

With regard to the optical sensor according to Aspect 12 of the present invention, in any one of Aspects 8 to 11 above, the light-emitting element may have two states of a first state in which the light-emitting element iteratively emits a pulse and a second state in which the light-emitting element emits no light in a period in which pulses are acquired from the light-receiving portion 1 and the light-receiving portion 2, the light-emitting element may iteratively operate with one period that is a period that arrives at a certain time ratio (time of first state:time of second state is a certain value) at which the first state and the second state satisfy time of first state>time of second state (a case where the states are established in a divided manner in one period is also included, and the time of each state in the time ratio is the total time of the state established in one period), the digital calculating portions for the light-receiving portion 1 and the light-receiving portion 2 may each count pulses in the first state and subtract a value obtained by multiplying a pulse count by a coefficient of (time of first state/time of second state) in one period in the second state, and every time n periods (n≥1) are ended, the digital value that is output from the digital calculating portion 1 for the light-receiving portion 1 may be input to a determining circuit portion 1, and it may be determined whether the digital value exceeds the reference value 1.

An electronic device according to Aspect 13 of the present invention includes the optical sensor according to any one of Aspects 8 to 12 above.

As described above, the optical sensor according to one aspect of the present invention acquires an effective pulse component in a short time by performing calculation for successively removing ambient light components in the measurement period, from the ratio between the period in which the light-emitting element emits light and the period in which the light-emitting element emits no light. Further, through acquisition of the effective pulse component, the optical sensor can discriminate between short distance and long distance in a short period, and select an appropriate light-emitting period for short distance or long distance, to thereby achieve both of accuracy at short distance and great distance measurement allowing the error due to a housing panel reflection component to be corrected. Further, with regard to reflected light from the housing panel, the optical sensor determines an effective pulse count that is obtained when a region other than a region that reflected light due to the housing panel enters is masked. When there is an effective pulse irrespective of the housing panel, the optical sensor determines that the detection target is present at short distance and performs measurement at short distance without masking the reflected light from the housing panel. When there is no effective pulse other than the reflected light from the housing panel, the optical sensor determines that the detection target is present at long distance and performs measurement at long distance while masking the reflected light from the housing panel. In this way, the optical sensor eliminates an error due to housing panel reflection in long distance measurement.

The present invention is not limited to each embodiment described above, and various modifications can be made thereto in the scope described in the claims. Embodiments obtained by appropriately combining the technical means disclosed in different embodiments are also included in the technical scope of the present invention. In addition, new technical features can be created by combining the technical means disclosed in each embodiment.

REFERENCE SIGNS LIST 11 first light-receiving portion
12 second light-receiving portion
13 first digital calculating portion
14 second digital calculating portion
15 determining circuit portion
16 reference pulse generating circuit
17 driver (driver circuit)
18 light-emitting element
19 time difference extracting circuit
20 delay difference measuring circuit
21 voltage-controlled delay circuit
22 ring oscillator
23 level shifter
24 level shifter
25 level shifter
30 mask circuit
31 one-shot pulse circuit
32 delay circuit
35 determining circuit portion
36 reference pulse generating circuit
46 reference pulse generating circuit
101, 201, 401, 501 optical sensor
S detection target (body)
x detection target distance

The invention claimed is:
1. An optical sensor comprising:
a light-emitting element;
a first light-receiving portion of a photon counting type configured to output a pulse in synchronization with incidence of a photon due to reflected light from a body;
a second light-receiving portion of the photon counting type placed near the light-emitting element and configured to output a pulse in synchronization with incidence of a photon due to reflected light from inside a sensor package;
a time difference extracting circuit configured to extract a time difference corresponding to distance on a spatial optical path by using pulse output from the first light-receiving portion, pulse output from the second light-receiving portion, and a reference clock;
first digital calculating circuitry configured to count pulses in the pulse output from the first light-receiving portion and output a digital value; and
a period changing circuit configured to change, when a pulse count with which sufficient measurement accuracy of a measured distance to the body is obtained is defined as a reference value, a light-emitting period of the light-emitting element, a light-emitting duration, and a period of the reference clock depending on whether or not the digital value that is output from the first digital calculating circuitry exceeds the reference value in distance measurement period.

2. The optical sensor according to claim 1, wherein
the light-emitting element has two states of a first state in which the light-emitting element iteratively emits a pulse and a second state in which the light-emitting element emits no light in a period in which pulses are acquired from the first light-receiving portion and the second light-receiving portion,
the light-emitting element iteratively operates with one period that is a period that arrives at a certain time ratio at which the first state and the second state satisfy time of first state>time of second state,
digital calculating circuitry for the first light-receiving portion and the digital calculating portion for the second light-receiving portion each count pulses in the first state and subtract a value obtained by multiplying a pulse count by a coefficient of time of first state/time of second state in one period in the second state, and
every time n periods (n≥1) are ended, the digital value that is output from the first digital calculating circuitry for the first light-receiving portion is input to a first determining circuit portion, and it is determined whether the digital value exceeds the reference value.

3. An electronic device comprising:
the optical sensor according to claim 1.

4. An optical sensor comprising:
a light-emitting element;
a first light-receiving portion of a photon counting type configured to output a pulse in synchronization with incidence of a photon due to reflected light from a body;
a second light-receiving portion of the photon counting type placed near the light-emitting element and configured to output a pulse in synchronization with incidence of a photon due to reflected light from inside a sensor package;
a time difference extracting circuit configured to extract a time difference corresponding to distance on a spatial optical path by using pulse output from the first light-receiving portion, pulse output from the second light-receiving portion, and a reference clock;
first digital calculating circuitry configured to count pulses in the pulse output from the first light-receiving portion and output a digital value; and
a period changing circuit configured to change, when a pulse count with which sufficient measurement accuracy of a measured distance to the body is obtained is defined as a reference value, a light-emitting period of the light-emitting element and a period of the reference clock depending on whether or not the digital value that is output from the first digital calculating circuitry exceeds the reference value in distance measurement period, wherein
the period changing circuit changes, when it is determined that the digital value that is output from the first digital calculating circuitry exceeds the reference value in the distance measurement period, each of the light-emitting period of the light-emitting element and the period of the reference clock to a period multiplied by a number set in advance.

5. The optical sensor according to claim 4, wherein
the light-emitting element has two states of a first state in which the light-emitting element iteratively emits a pulse and a second state in which the light-emitting element emits no light in a period in which pulses are acquired from the first light-receiving portion and the second light-receiving portion,
the light-emitting element iteratively operates with one period that is a period that arrives at a certain time ratio at which the first state and the second state satisfy time of first state>time of second state,
digital calculating circuitry for the first light-receiving portion and the second light-receiving portion each count pulses in the first state and subtract a value obtained by multiplying a pulse count by a coefficient of time of first state/time of second state in one period in the second state, and
every time n periods (n≥1) are ended, the digital value that is output from the first digital calculating circuitry for the first light-receiving portion is input to a first determining circuit portion, and it is determined whether the digital value exceeds the reference value.

6. An electronic device comprising:
the optical sensor according to claim 4.

7. An optical sensor comprising:
a light-emitting element;
a first light-receiving portion of a photon counting type configured to output a pulse in synchronization with incidence of a photon due to reflected light from a body;
a second light-receiving portion of the photon counting type placed near the light-emitting element and configured to output a pulse in synchronization with incidence of a photon due to reflected light from inside a sensor package;
a time difference extracting circuit configured to extract a time difference corresponding to distance on a spatial optical path by using pulse output from the first light-receiving portion, pulse output from the second light-receiving portion, and a reference clock;
a first digital calculating circuitry configured to count pulses in the pulse output from the first light-receiving portion and output a digital value; and
a period changing circuit configured to change, when a pulse count with which sufficient measurement accuracy of a measured distance to the body is obtained is defined as a reference value, a light-emitting period of the light-emitting element and a period of the reference clock depending on whether or not the digital value that is output from the first digital calculating circuitry exceeds the reference value in distance measurement period, wherein
the time difference extracting circuit includes
a first DLL configured to receive the pulse output from the first light-receiving portion, and
a second DLL configured to receive the pulse output from the second light-receiving portion, and
the period changing circuit performs switching, when the digital value that is output from the first digital calculating circuitry, which performs counting only in a period other than a first mask period that is iterated with the light-emitting period of the light-emitting element, does not exceed the reference value in the distance measurement period, to a state in which a pulse from the first light-receiving portion in a period other than a second mask period that is iterated with a half period of the light-emitting period is input to the first DLL, and performs switching to a state in which a pulse from the first light-receiving portion is directly input to the first DLL when the digital value exceeds the reference value.

8. The optical sensor according to claim 7, wherein the first DLL and the second DLL each include
a phase detector,
a voltage-controlled delay circuit, and
a capacitive element configured to hold a control voltage for the voltage-controlled delay circuit, and
the first DLL and the second DLL each charge the capacitive element to a certain value in a first period, input, to the phase detector, a clock obtained by ¼ frequency-dividing a reference clock of the voltage-controlled delay circuit, and a ¼ frequency-divided output of the voltage-controlled delay circuit in a second period, and input, to the phase detector, a pulse from the first light-receiving portion and a clock obtained by ½ frequency-dividing output of the voltage-controlled delay circuit in a third period.

9. The optical sensor according to claim 7, wherein
the light-emitting element has two states of a first state in which the light-emitting element iteratively emits a pulse and a second state in which the light-emitting element emits no light in a period in which pulses are acquired from the first light-receiving portion and the second light-receiving portion,
the light-emitting element iteratively operates with one period that is a period that arrives at a certain time ratio at which the first state and the second state satisfy time of first state>time of second state,
digital calculating circuitry for the first light-receiving portion and the second light-receiving portion each count pulses in the first state and subtract a value obtained by multiplying a pulse count by a coefficient of time of first state/time of second state in one period in the second state, and
every time n periods (n≥1) are ended, the digital value that is output from the first digital calculating circuitry for the first light-receiving portion is input to a first determining circuit portion, and it is determined whether the digital value exceeds the reference value.

10. An electronic device comprising:
the optical sensor according to claim 7.

* * * * *